United States Patent
Kobayashi

(10) Patent No.: US 11,405,510 B2
(45) Date of Patent: Aug. 2, 2022

(54) IMAGE READER DETERMINES IF READ IMAGE DATA OF TEST PATTERN SATISFIES PREDETERMINED CONDITION BEFORE RESUMING READING OF TEST PATTERN

(71) Applicant: Brother Kogyo Kabushiki Kaisha, Nagoya (JP)

(72) Inventor: Isao Kobayashi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/392,360

(22) Filed: Aug. 3, 2021

(65) Prior Publication Data

US 2022/0060589 A1    Feb. 24, 2022

(30) Foreign Application Priority Data

Aug. 19, 2020   (JP) ............................. JP2020-138725

(51) Int. Cl.
  *H04N 1/00*      (2006.01)
  *H04N 1/60*      (2006.01)

(52) U.S. Cl.
  CPC ..... *H04N 1/00045* (2013.01); *H04N 1/00013* (2013.01); *H04N 1/00037* (2013.01); *H04N 1/00076* (2013.01); *H04N 1/00082* (2013.01); *H04N 1/00795* (2013.01); *H04N 1/6044* (2013.01)

(58) Field of Classification Search
  CPC ........... H04N 1/00013; H04N 1/00037; H04N 1/00045; H04N 1/00076; H04N 1/00082; H04N 1/00795; H04N 1/00798; H04N 1/00814; H04N 1/6033; H04N 1/6044
  See application file for complete search history.

(56) References Cited

U.S. PATENT DOCUMENTS

| 5,712,666 | A | 1/1998 | Matsubara et al. | |
| 9,854,216 | B2* | 12/2017 | Furumochi | .......... H04N 5/3742 |
| 10,349,028 | B2* | 7/2019 | Furumochi | .......... H04N 5/3456 |
| 10,567,620 | B2* | 2/2020 | Tao | ...................... B41J 2/16579 |

(Continued)

FOREIGN PATENT DOCUMENTS

| JP | H05-42682 A | 2/1993 |
| JP | 2003-255626 A | 9/2003 |
| JP | 2010-004476 A | 1/2010 |

*Primary Examiner* — Scott A Rogers
(74) *Attorney, Agent, or Firm* — Burr & Brown, PLLC

(57) ABSTRACT

An image reading apparatus, having a placement table, a reader to read an image recorded on the recordable medium placed on the placement table while moving in one direction, a memory storing information concerning a test pattern, and a controller, is provided. The controller is configured to, when instructed to read the test pattern, control the reader to stop reading to pause before reading the test pattern completely, while the reader pauses, based on read data generated from an outcome of reading of the test pattern so far and the information concerning the test pattern, determine whether the read data satisfies a predetermined condition, and when the read data satisfies the predetermined condition, control the reader to resume reading the test pattern, but when the read data does not satisfy the predetermined condition, control the reader to abort reading the test pattern and output an error alerting signal.

12 Claims, 18 Drawing Sheets

(56) References Cited

U.S. PATENT DOCUMENTS 10,728,406 B1 * 7/2020 Liao .................. H04N 1/00554
2003/0161058 A1 8/2003 Azumai
2009/0316218 A1 12/2009 Miyagi

* cited by examiner

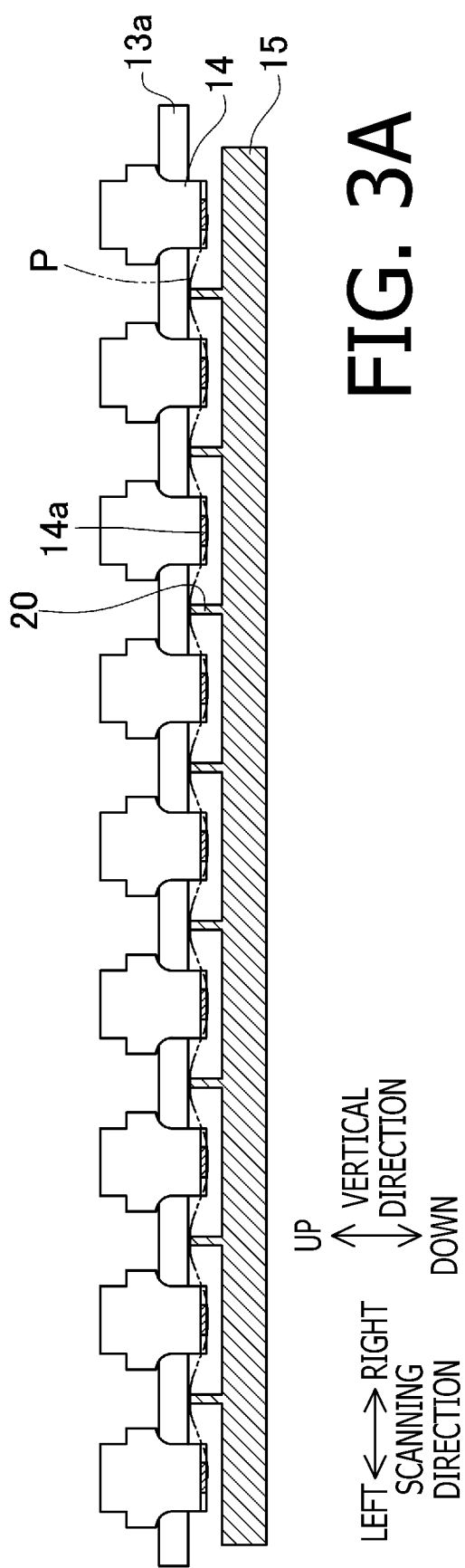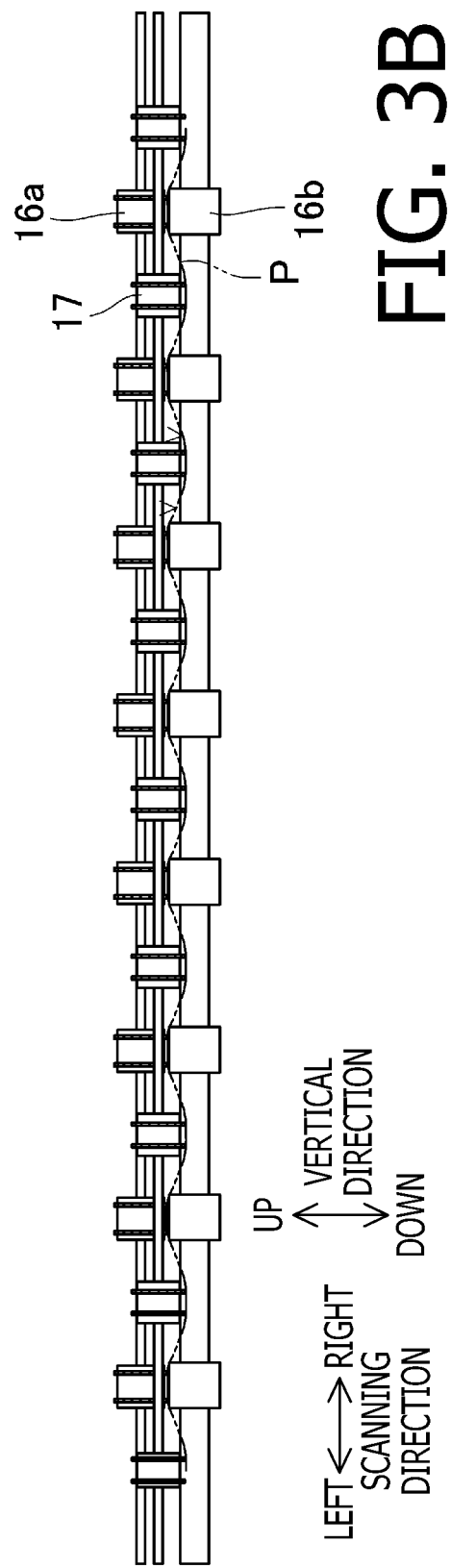

IMAGE READER DETERMINES IF READ IMAGE DATA OF TEST PATTERN SATISFIES PREDETERMINED CONDITION BEFORE RESUMING READING OF TEST PATTERN

CROSS REFERENCE TO RELATED APPLICATION

This application claims priority under 35 U.S.C. § 119 from Japanese Patent Application No. 2020-138725, filed on Aug. 19, 2020, the entire subject matter of which is incorporated herein by reference.

BACKGROUND

Technical Field

An aspect of the present disclosure is related to an image reading apparatus capable of reading images, a multifunction peripheral machine including an image reading apparatus, an image reading system, an image reading method for reading images, and a computer-readable storage medium for storing computer-readable instructions to cause an image reading apparatus to read images.

Related Art

An image reading apparatus capable of reading images is known. For example, a multicolor copier may include an image reading-processing device, or an image reader, which may be an example of the image reading apparatus. The multicolor copier may further include a printing device, or a printer, which may record readable patterns to be read by the image reader on a recordable medium. The readable patterns may include, for example, 16 blocks of patterns, which are in four rows extending along one direction and arrayed along a direction orthogonal to the one direction, while each of the rows is related to one of four different colored inks and includes four blocks. The recordable sheet, on which the readable patterns are recorded, may be placed on a placement table in the image reader by a user, and in a single scanning action by a CCD line sensor provided in the image reader, four blocks in one of the four rows recorded in one of the four different colored inks may be read. Next, the image reader may examine the read data and, when an error cause is detected in the read data, the multicolor copier may display an error alert to the user. The image reader may continue reading another four blocks of the patterns in another row and onward.

SUMMARY

The error may be caused by conditions such as, for example, displacement of the recordable sheet with the readable patterns recorded thereon from a correct position in the image reader, or, for another example, malfunctioning of a recording head that discharged the ink. The image reader may start examining data obtained from the reading once the four blocks of patterns are read completely in the single scanning action. Meanwhile, the error condition(s) may reside in one of the four blocks to be read firstly, and the error may be detected as soon as the first one of the four blocks of patterns is examined. In other words, when the error is detected in the first one of the four blocks of patterns, reading of the other three blocks may be performed in vain to discard the read outcome.

An aspect of the present disclosure is advantageous in that an image reading apparatus, a multifunction peripheral machine, and an image reading system, which may avoid wasteful reading of test patterns when the test patterns are likely to cause an error, are provided; and in that a method for reading the test patterns and a computer-readable storage medium for storing computer-readable instructions for reading the test patterns are provided.

According to an aspect of the present disclosure, an image reading apparatus, having a placement table, on which a recordable medium with an image recorded thereon is placeable, a reader configured to read the image recorded on the recordable medium placed on the placement table, the reader being configured to move in one direction while reading the image, a memory configured to store information concerning a test pattern, and a controller configured to control the reader to read the image recorded on the recordable medium placed on the placement table, is provided. The controller is configured to, when instructed to read the test pattern being the image recorded on the recordable sheet, control the reader to stop reading to pause before reading the test pattern completely, while the reader pauses, based on read data generated from an outcome of reading of the test pattern so far and the information concerning the test pattern stored in the memory, determine whether the read data satisfies a predetermined condition, and when the read data satisfies the predetermined condition, control the reader to resume reading the test pattern, but when the read data does not satisfy the predetermined condition, control the reader to abort reading the test pattern and output an error alerting signal indicating that the read data contains an error.

According to another aspect of the present disclosure, a multifunction peripheral machine, having a recorder configured to record an image on a recordable medium, a placement table, on which a recordable medium with an image recorded thereon is placeable, a reader configured to read the image recorded on the recordable medium placed on the placement table, the reader being configured to move in one direction while reading the image, a memory configured to store information concerning a test pattern, and a controller, is provided. The controller is configured to control the recorder to record the test pattern being the image on the recordable medium, when instructed to read the test pattern, control the reader to start reading the test pattern recorded on the recordable medium placed on the placement table, control the reader to stop reading to pause before reading the test pattern completely, while the reader pauses, based on read data generated from an outcome of reading of the test pattern so far and the information concerning the test pattern stored in the memory, determine whether the read data satisfies a predetermined condition, and when the read data satisfies the predetermined condition, control the reader to resume reading the test pattern, but when the read data does not satisfy the predetermined condition, control the reader to abort reading the test pattern and output an error alerting signal indicating that the read data contains an error.

According to another aspect of the present disclosure, A system, having an image recording apparatus configured to record an image on a recordable medium, an image reading apparatus, having a placement table, on which a recordable medium with an image recorded thereon is placeable and a reader configured to read the image recorded on the recordable medium placed on the placement table, the reader being configured to move in one direction while reading the image, a memory configured to store information concerning a test pattern, and a controller, is provided. The controller is configured to control the recorder to record the test pattern being the image on the recordable medium, when instructed to read the test pattern, control the reader to start reading the test pattern recorded on the recordable medium placed on the placement table, control the reader to stop reading to pause before reading the test pattern completely, while the reader pauses, based on read data generated from an outcome of reading of the test pattern so far and the information concerning the test pattern stored in the memory, determine whether the read data satisfies a predetermined condition, and when the read data satisfies the predetermined condition, control the reader to resume reading the test pattern, but when the read data does not satisfy the predetermined condition, control the reader to abort reading the test pattern and output an error alerting signal indicating that the read data contains an error.

According to another aspect of the present disclosure, an image reading method for an image reading apparatus to read an image having a placement table, on which a recordable medium with an image recorded thereon is placeable, a reader configured to read the image recorded on the recordable medium placed on the placement table, the reader being configured to move in one direction while reading the image, and a memory configured to store information concerning a test pattern, is provided. The method include controlling, when the image reading apparatus is instructed to read the test pattern being the image recorded on the recordable medium placed on the placement table, the reader to stop reading to pause before reading the test pattern completely, determining, while the reader pauses, based on read data generated from an outcome of reading of the test pattern so far and the information concerning the test pattern stored in the memory, whether the read data satisfies a predetermined condition, and controlling, when the read data satisfies the predetermined condition, the reader to resume reading the test pattern, but when the read data does not satisfy the predetermined condition, controlling the reader to abort reading the test pattern and outputting an error alerting signal indicating that the read data contains an error.

According to another aspect of the present disclosure, a non-transitory computer readable storage medium storing computer readable instructions that are executable by a computer configured to control an image recording apparatus, having a placement table, on which a recordable medium with an image recorded thereon is placeable, a reader configured to read the image recorded on the recordable medium placed on the placement table, the reader being configured to move in one direction while reading the image, and a memory configured to store information concerning a test pattern, is provided. The computer readable instructions, when executed by the computer, and when the computer is instructed to read the test pattern being the image recorded on the recordable sheet placed on the placement table, cause the computer to control the reader to start reading the test pattern, control the reader to stop reading to pause before reading the test pattern completely, while the reader pauses, based on read data generated from an outcome of reading of the test pattern so far and the information concerning the test pattern stored in the memory, determine whether the read data satisfies a predetermined condition, and when the read data satisfies the predetermined condition, control the reader to resume reading the test pattern, but when the read data does not satisfy the predetermined condition, control the reader to abort reading the test pattern and output an error alerting signal indicating that the read data contains an error.

BRIEF DESCRIPTION OF THE ACCOMPANYING DRAWINGS

FIG. 3A illustrates a part of the image recorder according to the embodiment of the present disclosure viewed along an arrow IIIA shown in FIG. 2. FIG. 3B illustrates a part of the image recorder according to the embodiment of the present disclosure viewed along an arrow IIIB shown in FIG. 2.

Figure 10A:
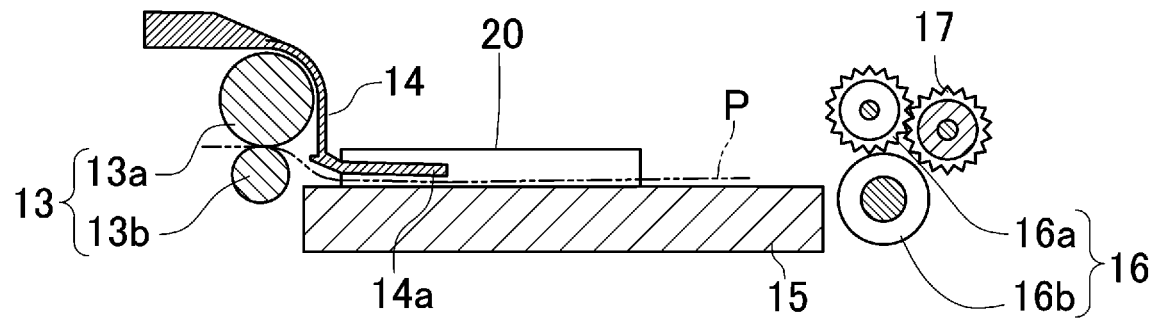
Figure 10B:
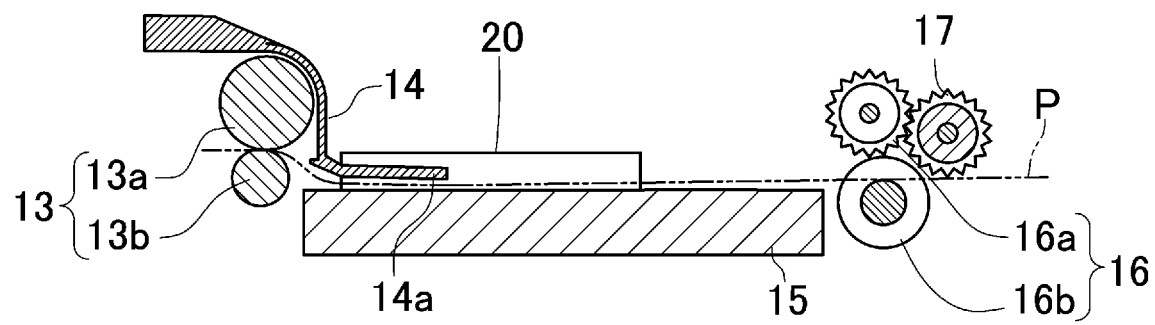
Figure 10C:
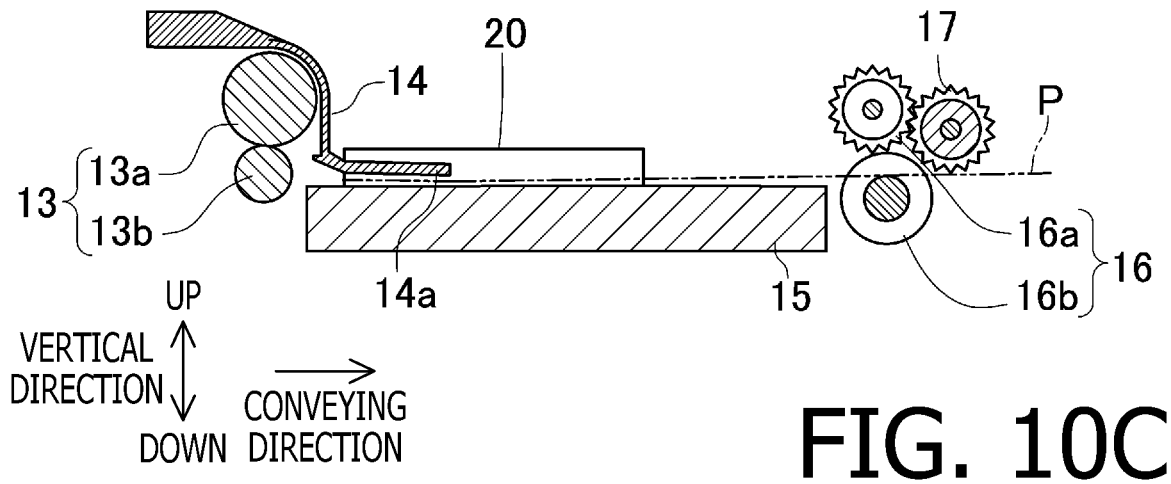
Figure 10D:
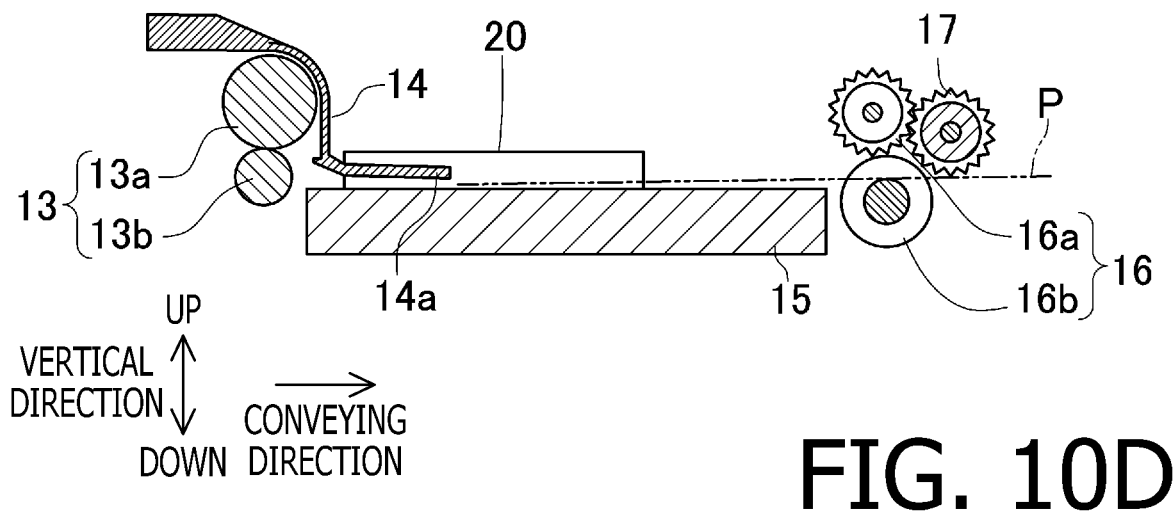

FIG. 10A illustrates a recordable sheet being nipped by a conveyer roller but not nipped by an ejection roller in the recorder in the multifunction peripheral machine according to the embodiment of the present disclosure. FIG. 10B illustrates the recordable sheet being nipped by the conveyer roller and the ejection roller in the recorder in the multifunction peripheral machine according to the embodiment of the present disclosure. FIG. 10C illustrates the recordable sheet being nipped by the ejection roller but not nipped by the conveyer roller in the recorder in the multifunction peripheral machine according to the embodiment of the present disclosure. FIG. 10D illustrates the recordable sheet, of which upstream end in a conveying direction exited a pressing portion in the recorder in the multifunction peripheral machine, according to the embodiment of the present disclosure.

Figure 11A:
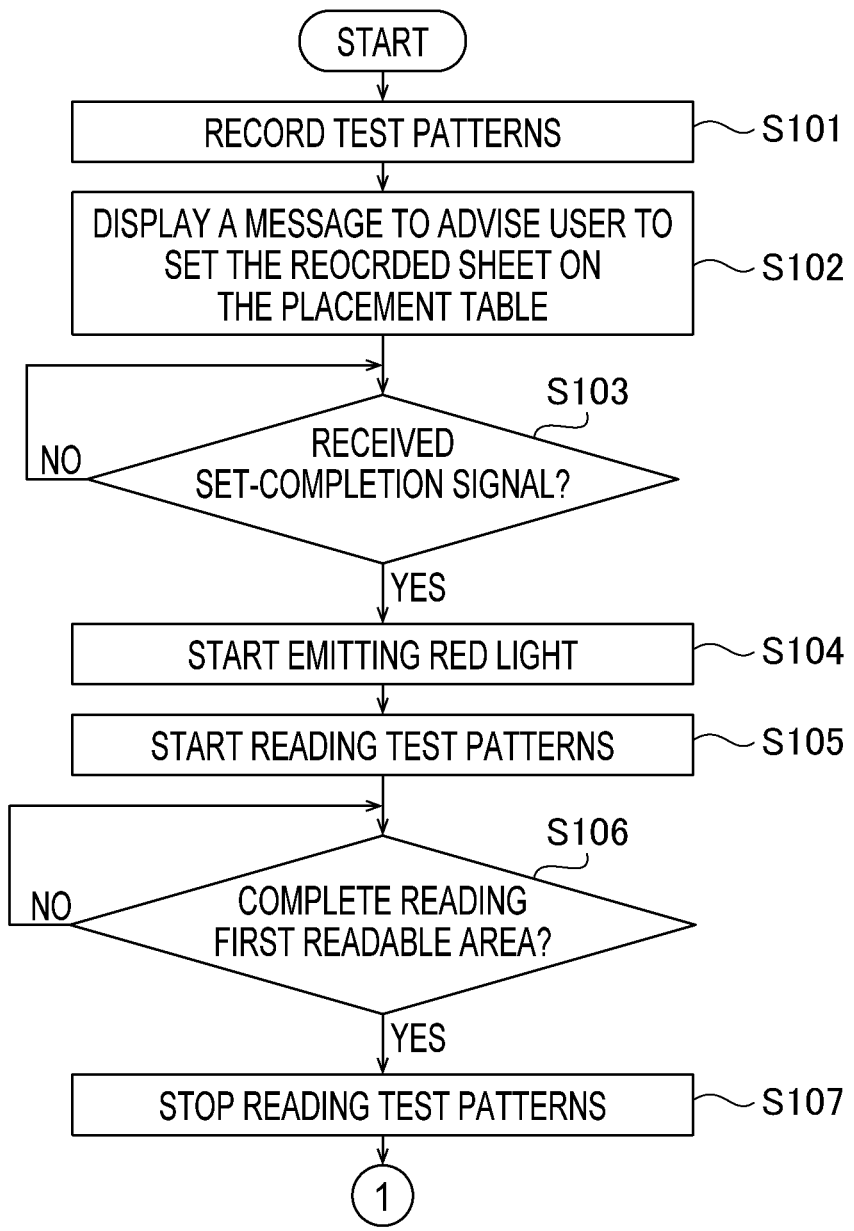
Figure 11B:
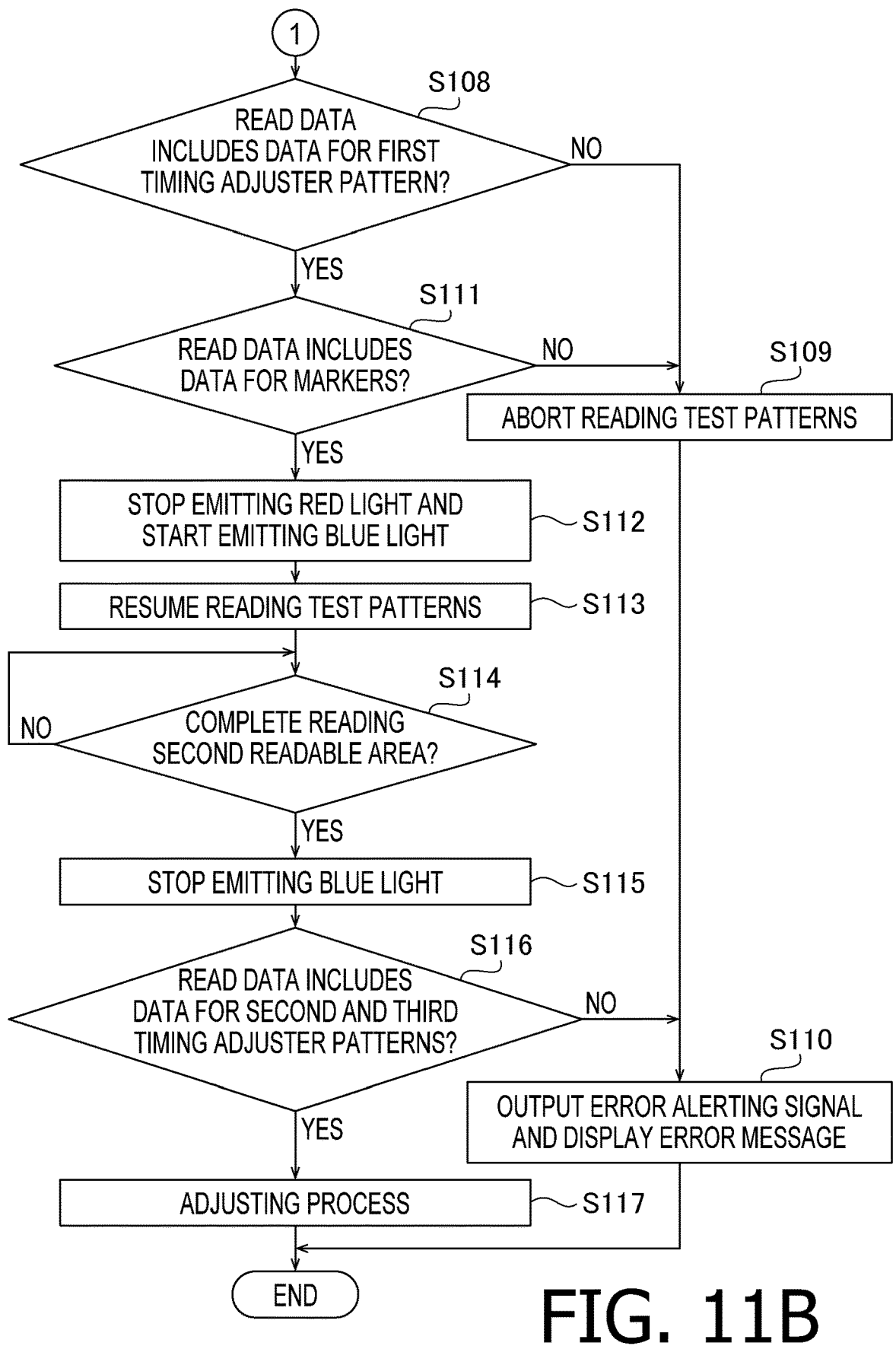

FIGS. 11A-11B are flowcharts to illustrate flows of steps to be conducted by a controller in the multifunction peripheral machine to adjust settings in the image recorder according to the embodiment of the present disclosure.

Figure 12A:
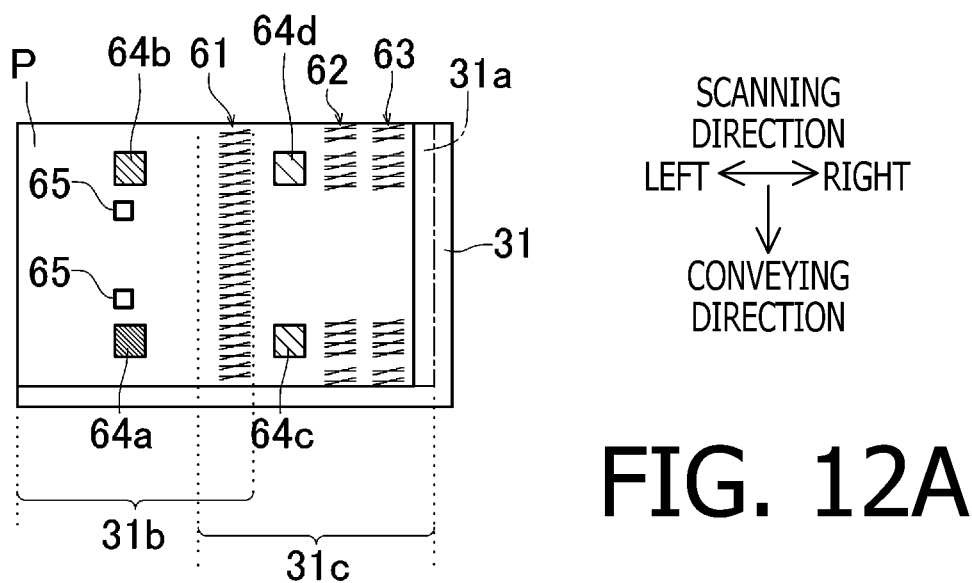
Figure 12B:
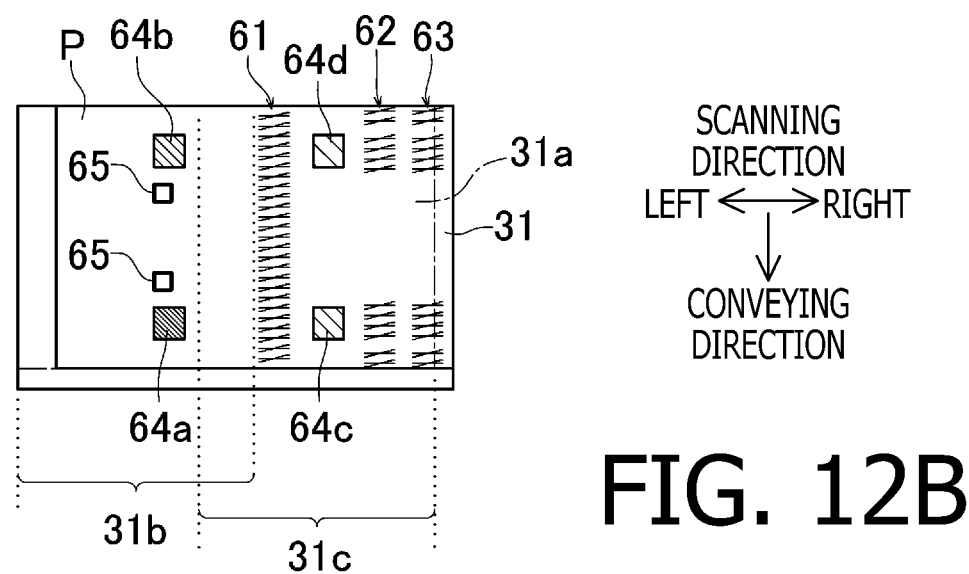
Figure 12C:
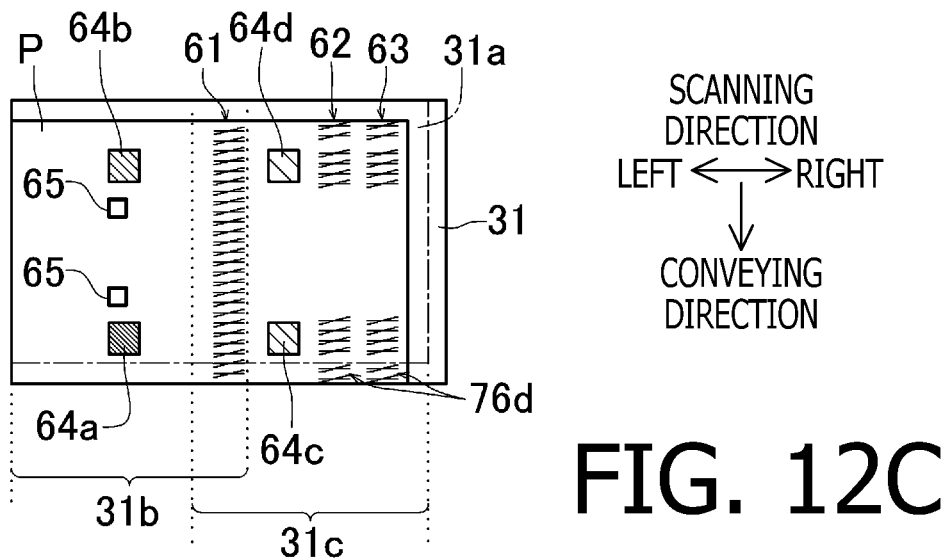
Figure 12D:
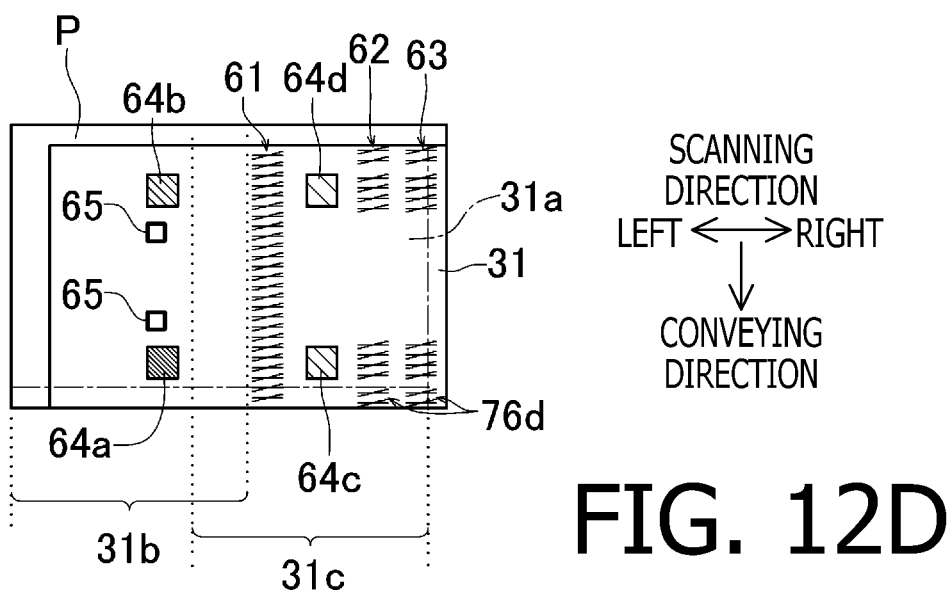

FIG. 12A illustrates the recordable sheet with the test patterns recorded thereon being placed on the placement table in a predetermined orientation at a predetermined position according to the embodiment of the present disclosure. FIG. 12B illustrates the recordable sheet with the test patterns recorded thereon being placed on the placement table in the predetermined orientation at a position displaced rightward from the predetermined position according to the embodiment of the present disclosure. FIG. 12C illustrates the recordable sheet with the test patterns recorded thereon being placed on the placement table in the predetermined orientation at a position displaced downstream in a conveying direction from the predetermined position according to the embodiment of the present disclosure. FIG. 12D illustrates the recordable sheet with the test patterns recorded thereon being placed on the placement table in the predetermined orientation at a position displaced rightward and downstream in the conveying direction from the predetermined position according to the embodiment of the present disclosure.

Figure 13A:
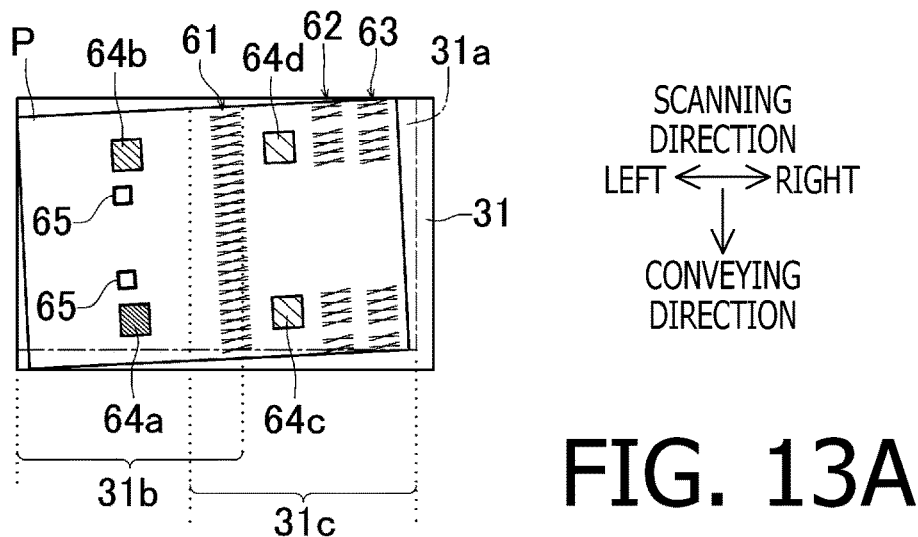
Figure 13B:
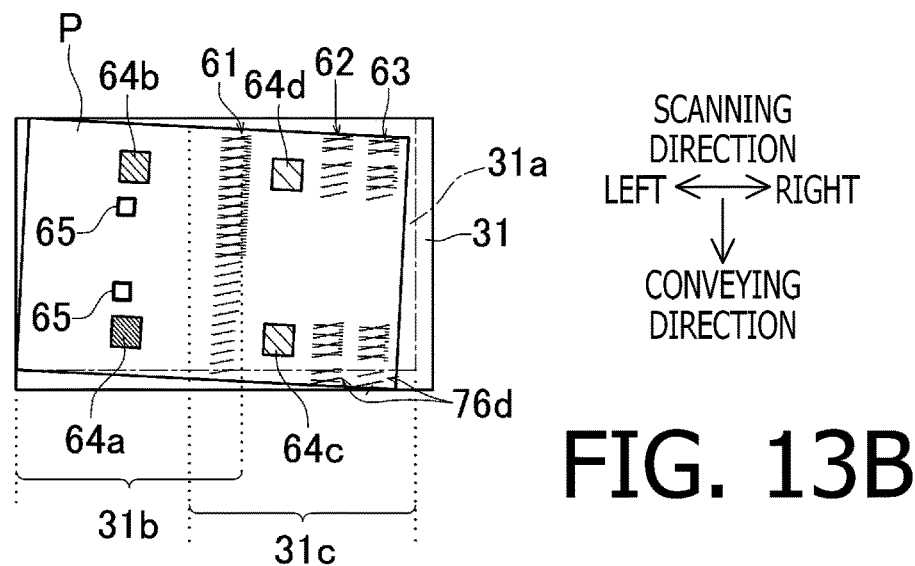
Figure 13C:
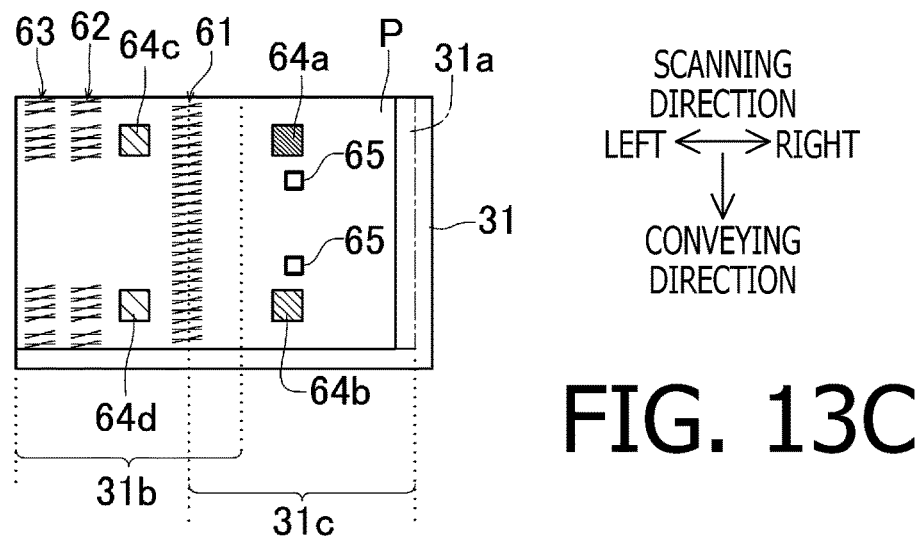

FIG. 13A illustrates the recordable sheet with the test patterns recorded thereon being placed on the placement table at a skewed position with respect to the predetermined position such that a leftward part of the recordable sheet is located downstream in the conveying direction according to the embodiment of the present disclosure. FIG. 13B illustrates the recordable sheet with the test patterns recorded thereon being placed on the placement table at a skewed position with respect to the predetermined position such that the leftward part of the recordable sheet is located upstream in the conveying direction according to the embodiment of the present disclosure. FIG. 13C illustrates the recordable sheet with the test patterns recorded thereon being placed on the placement table in at a position rotated by 180 degrees with respect to the predetermined position according to the embodiment of the present disclosure.

Figure 14:
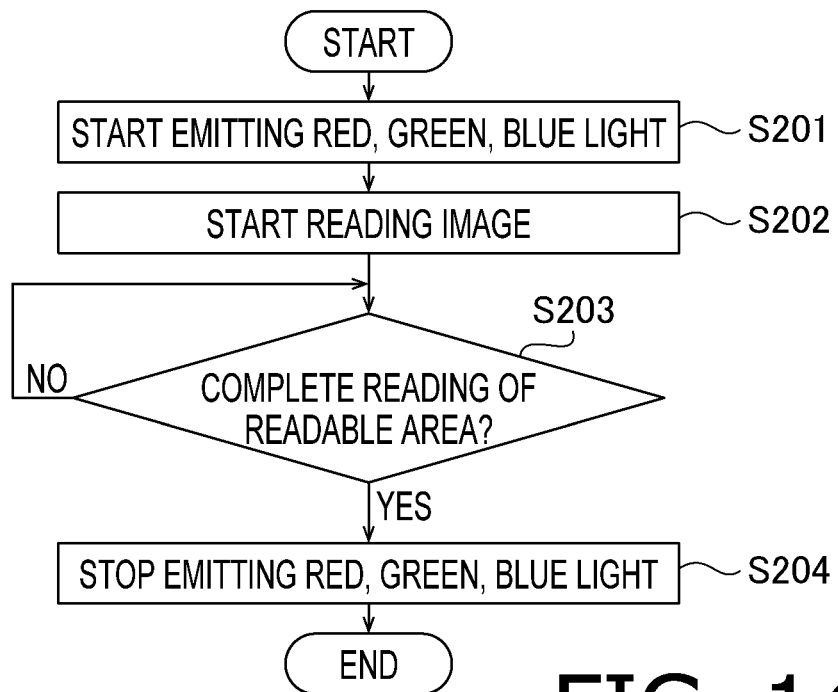

FIG. 14 is a flowchart to illustrate a flow of steps to be conducted in the multifunction peripheral machine to read an image different from the test patterns according to the embodiment of the present disclosure.

Figure 15:
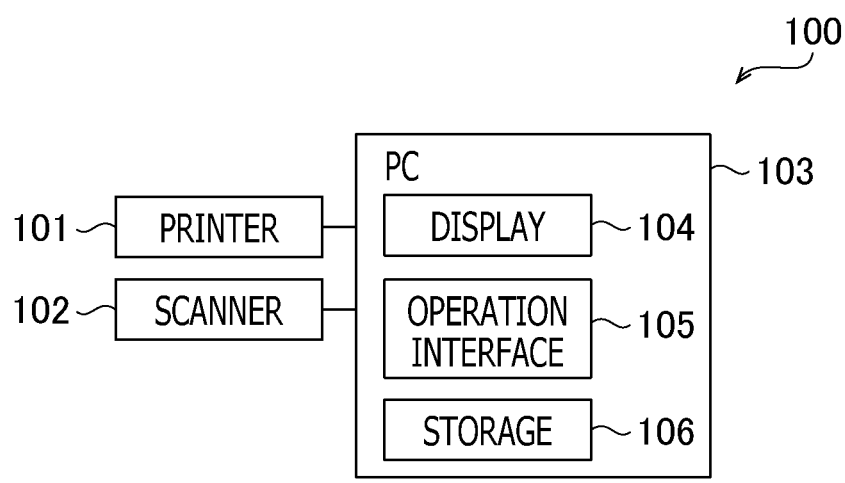

FIG. 15 is a block diagram to illustrate a system in a modified example of the embodiment of the present disclosure.

Figure 16A:
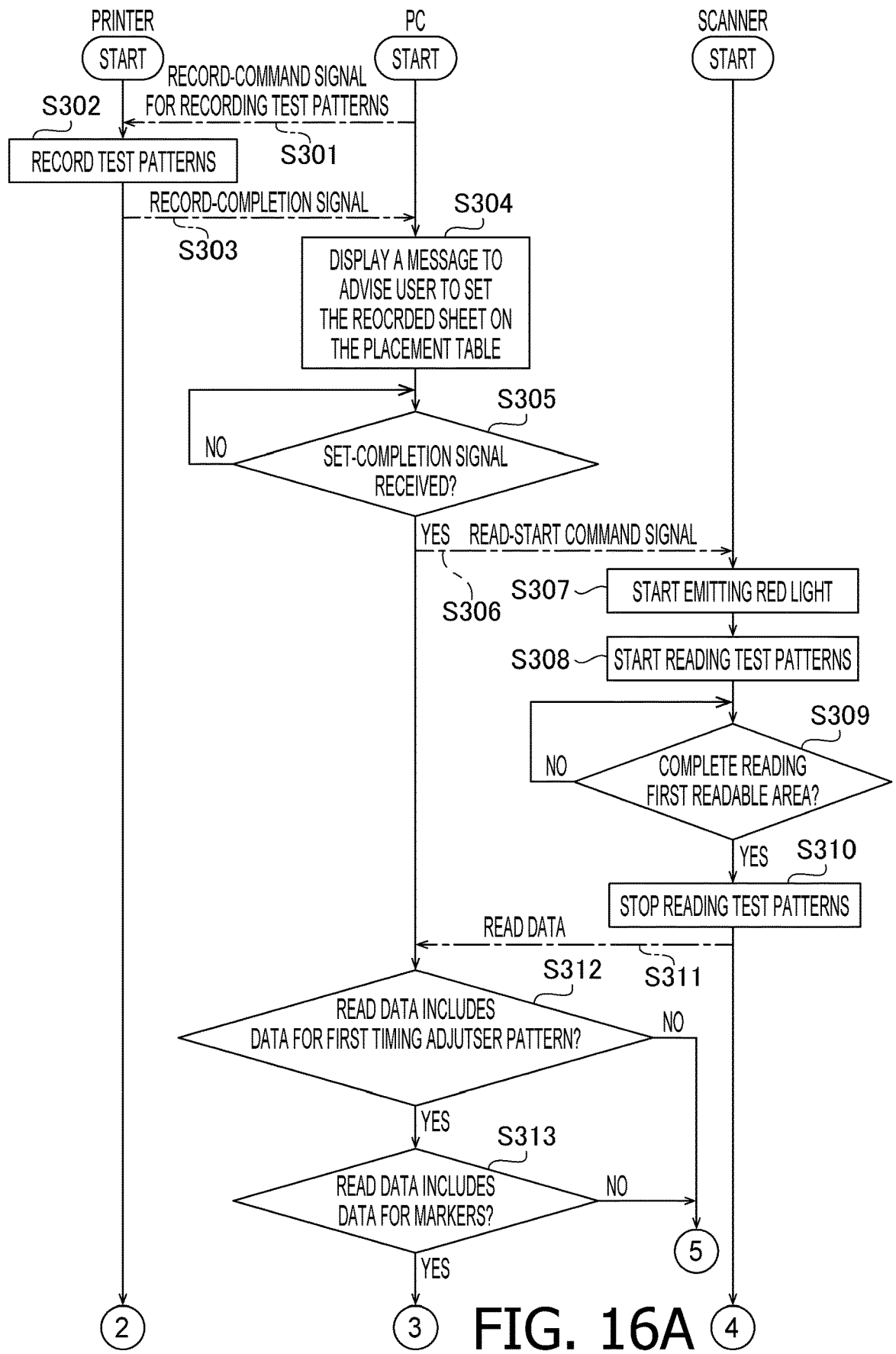
Figure 16B:
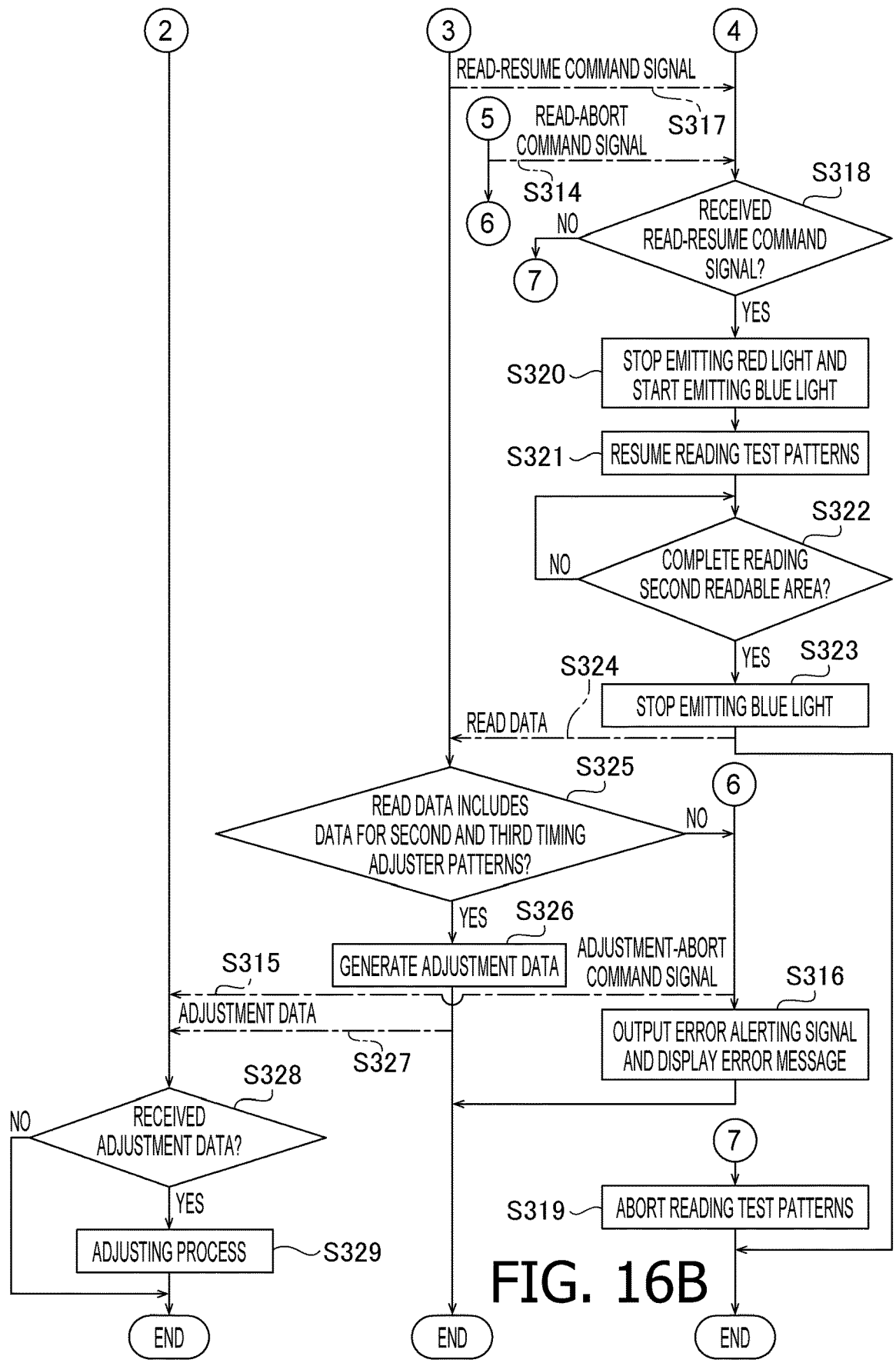

FIGS. 16A-16B are flowcharts to illustrate flows of steps to be conducted in a PC, a printer, and a scanner to adjust settings in the printer according to the embodiment of the present disclosure.

DETAILED DESCRIPTION

Hereinafter, embodiments according to an aspect of the present disclosure will be described in detail with reference to the accompanying drawings.

It may be noted that various connections may be set forth between elements in the following description. These connections in general and, unless specified otherwise, may be direct or indirect and that this specification is not intended to be limiting in this respect. Aspects of the disclosure may be implemented in computer software as programs storable on computer readable media including but not limited to a random access memory (RAM), a read-only memory (ROM), a flash memory, an electrically erasable ROM (EEPROM), a CD-media, DVD-media, temporary storage, hard disk drives, floppy drives, permanent storage, and the like.

<Overall Configuration of Multifunction Peripheral Machine>

Figure 1:
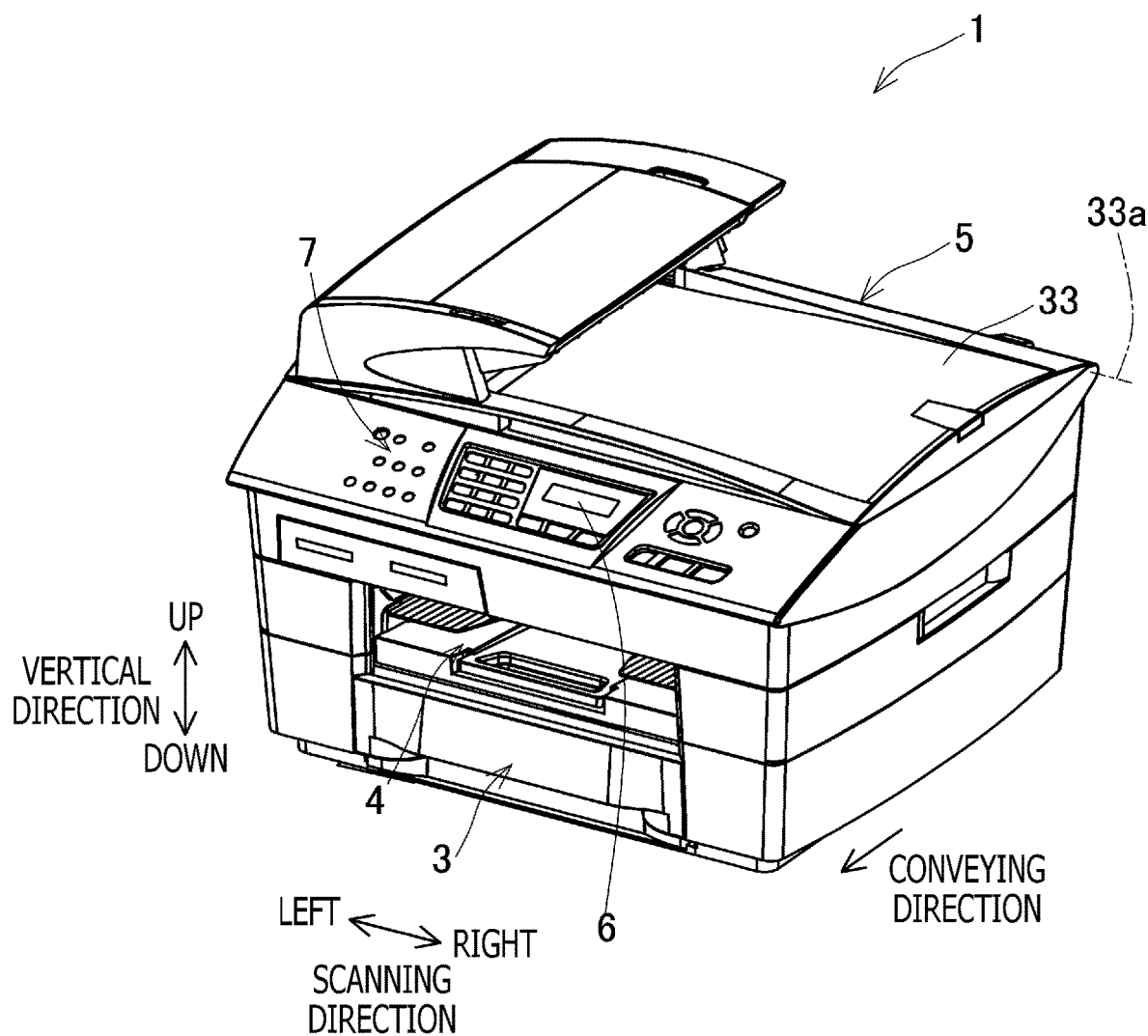
FIG. 1 is an overall perspective view of a multifunction peripheral machine according to an exemplary embodiment of the present disclosure.

As shown in FIG. 1, a multifunction peripheral machine 1 includes an image recorder 2 (see FIG. 2), a feeder 3, an ejector 4, an image reader 5, a display 6, and an operation interface 7. Further, the multifunction peripheral machine 1 includes a controller 50 (see FIG. 7) configured to control operations and actions in the multifunction peripheral machine 1.

The image recorder 2 is disposed inside the multifunction peripheral machine 1. The image recorder 2 may record an image on a recordable sheet P. A detailed configuration of the image recorder 2 will be described further below. The feeder 3 may feed the recordable sheet P to the image recorder 2. The ejector 4 may eject the recordable sheet P, on which an image is recorded by the image recorder 2, outside. The image reader 5 may read images on original sheets. A detailed configuration of the image reader 5 will be described further below. The display 6 may be a liquid crystal display, which may display information when the multifunction peripheral machine 1 is being used. The operation interface 7 may include buttons and a touch panel arranged in the display 6 and may receive signals corresponding to a user's operations to the operation interface 7.

<Configuration of Image Recorder>

Figure 2:
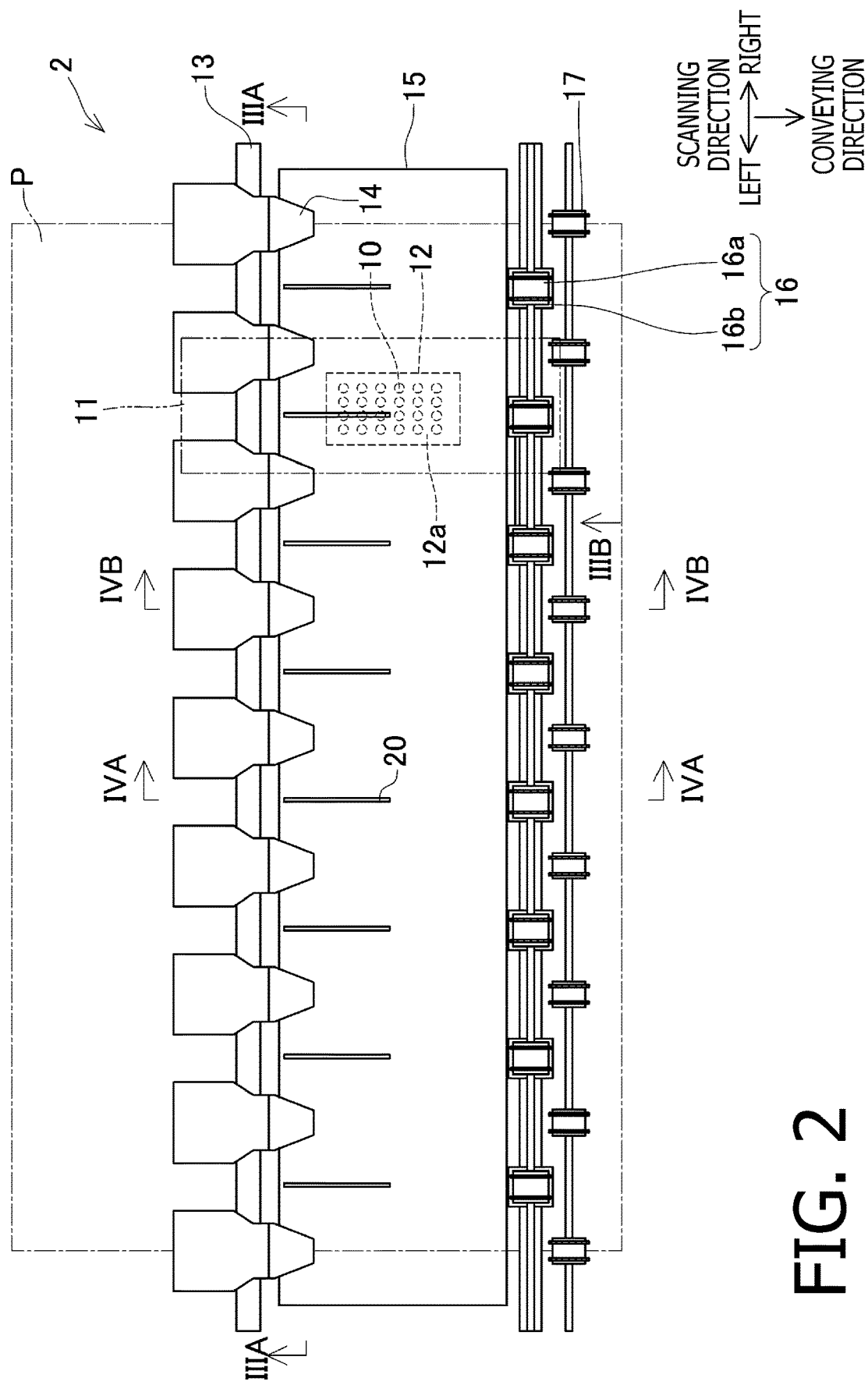
FIG. 2 is a plan view of an image recorder in the multifunction peripheral machine according to the embodiment of the present disclosure.
Figure 4A:
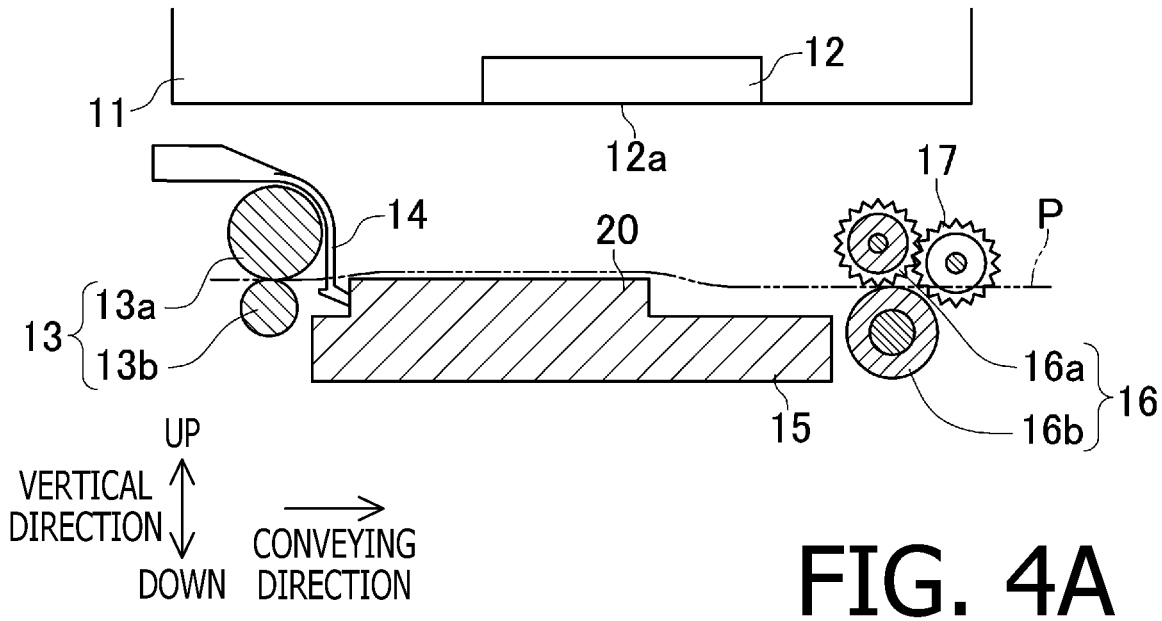
FIG. 4A is a cross-sectional view at a section along a line IVA-IVA shown in FIG. 2 according to the embodiment of the present disclosure.
Figure 4B:
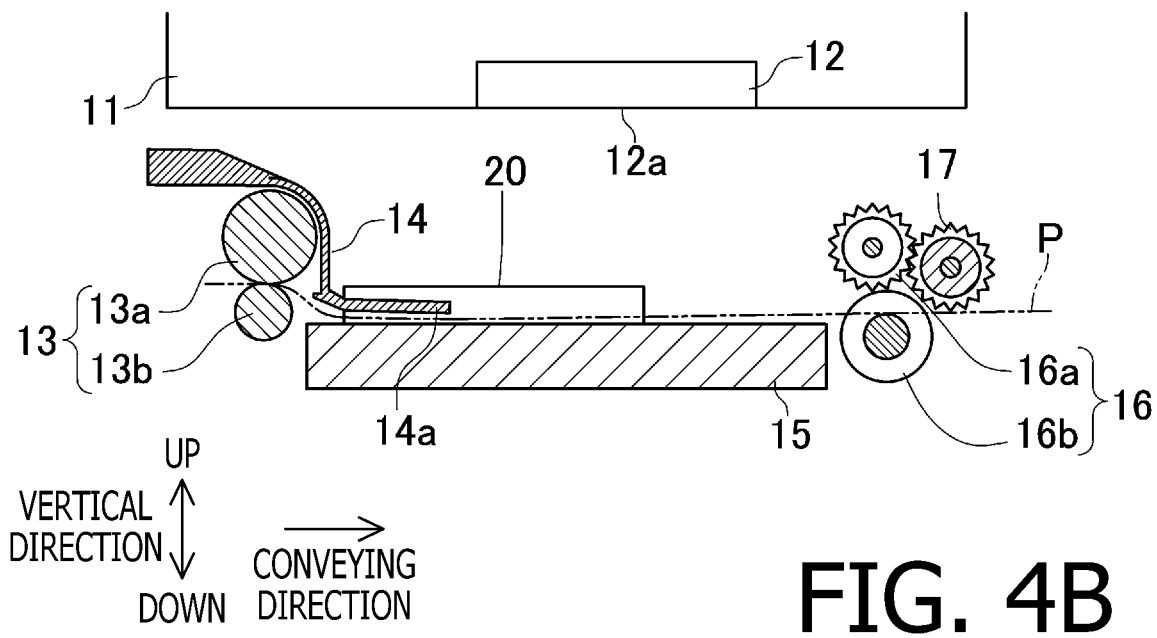
FIG. 4B is a cross-sectional view at a section along a line IVB-IVB shown in FIG. 2 according to the embodiment of the present disclosure.

The image recorder 2 will be described below. As shown in FIGS. 2-4, the image recorder 2 includes a carriage 11, an inkjet head 12, a conveyer roller 13, a plurality of corrugating plates 14, a platen 15, a plurality of ejection rollers 16, and a plurality of corrugating spur wheels 17. It may be noted that, to aid visual understanding of the structure of the image recorder 2, in FIG. 2, the carriage 11 in an exemplary position is drawn in a dash-and-two-dots line, and items disposed below the carriage 11 are drawn in solid lines. Further, in FIG. 2, illustration of some of structures that support the carriage 11, e.g., a guiderail, may be omitted.

The carriage 11 is supported by the guide rail (not shown) and may move on the guiderail in a scanning direction. In the present embodiment, the scanning direction includes a leftward (right-to-left) direction and a rightward (left-to-right) direction (see FIGS. 1 and 2, for example) and may be referred to as a widthwise direction. The carriage 11 is connected to a carriage motor 56 (see FIG. 7) through a belt (not shown). By activating the carriage motor 56, the carriage 11 may move in the scanning direction. In the following description, one end on the left and the other end on the right in the scanning direction will be defined as a leftward end and a rightward end, respectively.

The inkjet head 12 is mounted on the carriage 11 to be moved along with the carriage 11. The inkjet head 12 may perform a discharging action to discharge ink through a plurality of nozzles 10 formed in an ink discharging surface 12a, which may be a lower surface of the inkjet head 12, to record dots forming an image on the recordable sheet P. The nozzles 10 are arrayed in line along a conveying direction that extends orthogonally to the scanning direction to form a nozzle array 9. Further, in the inkjet head 12, a plurality of, e.g., four (4), nozzle arrays 9 are formed so that inks in four colors, e.g., black, yellow, cyan, and magenta, may be discharged separately from each nozzle array 9.

The conveyer roller 13 is arranged at a position upstream from the inkjet head 12 in the conveying direction to convey the recordable sheet P. The conveyer roller 13 includes an upper roller 13a and a lower roller 13b, which may nip therebetween the recordable sheet P fed by the feeder 3 and convey the recordable sheet P from upstream to downstream, or from one side toward the other side, in the conveying direction. The upper roller 13a may be driven to rotate by a conveyer motor 57 (see FIG. 7), and the lower roller 13b may be rotated passively along with rotation of the upper roller 13a.

The plurality of corrugating plates 14 are disposed to extend from a position coincident with the conveyer roller 13 to a position downstream from the conveyer roller 13 in the conveying direction. The corrugating plates 14 are arranged to be spaced apart evenly from one another at an interval along the scanning direction. Each of the corrugating plates 14 includes a presser 14a, which may press the recordable sheet P downward, at a downstream end thereof with regard to the conveying direction.

The platen 15 is arranged at a position downstream from the conveyer roller 13 in the conveying direction to face the ink discharging surface 12a of the inkjet head 12. The platen 15 is arranged to longitudinally extend in the scanning direction to cover an entire movable range of the carriage 11 that is movable to reciprocate during a recording operation. On an upper surface of the platen 15, formed are a plurality of ribs 20, which extend in the conveying direction. The ribs 20 are arranged to be spaced apart evenly from one another at the interval along the scanning direction at positions between adjoining corrugating plates 14.

The ejection rollers 16 are arranged at positions downstream from the inkjet head 12 in the conveying direction. The ejection rollers 16 are located at the same positions as the ribs 20 in the scanning direction. Each ejection roller 16 includes an upper roller 16a and a lower roller 16b, between which the recordable sheet P may be nipped from above and below to be conveyed in the conveying direction. The ejection rollers 16 thus convey the recordable sheet Pin the conveying direction toward the ejector 4. The lower rollers 16b may be driven to rotate by the conveyer motor 57 (see FIG. 7). The upper rollers 16a are spur wheels and may be rotated passively by the rotation of the lower rollers 16b. The upper rollers 16a may contact a recorded surface of the recordable sheet P, which is a surface having an image recorded thereon in the recording operation. However, while the upper rollers 16a are spurs, of which outer circumferences are not smooth, the ink in the recorded image on the recordable sheet P may be restrained from being adhering to the upper rollers 16a. Thus, the conveyer roller 13 and the ejection rollers 16 may convey the recordable sheet P. The conveyer roller 13 and the ejection rollers 16 may convey the recordable sheet P to move relatively in the conveying direction to the inkjet head 12.

The corrugating spur wheels 17 are arranged at positions downstream from the ejection rollers 16 in the conveying direction. The corrugating spur wheels 17 are substantially at the same positions as the pressers 14a of corrugating plates 14 in the scanning direction. Meanwhile, the corrugating spur wheels 17 are located at a position lower than the upper rollers 16a of the ejection rollers 16. Therefore, the corrugating spur wheels 17 support the recordable sheet P from above at a position lower than the position, at which the ejection rollers 16 nip the recordable sheet P. Meanwhile, however, lower ends of the corrugating spur wheels 17 are located at a position higher than the pressers 14a of the corrugating plates 14. Therefore, an intensity of the corrugating spur wheels 17 to press the recordable sheet P may be smaller than an intensity of the corrugating plate 14 pressing the recordable sheet P. Therefore, the ink on the recordable sheet P may be restrained from adhering to the corrugating spur wheels 17. Moreover, the corrugating spur wheels 17 are not rollers with smooth outer circumferences but spur wheels. Therefore, the ink on the recordable sheet P may be restrained from adhering to the corrugating spur wheels 17 effectively.

Thus, the recordable sheet P may be supported by the ribs 20 and the lower rollers 16b on a lower surface from below and by the pressers 14a of the corrugating plates 14 and the corrugating spur wheels 17 on the upper surface from above to be shaped into the corrugated form, as shown in FIGS. 3 and 4, which waves up and down along the scanning direction.

The image recorder 2 may record an image on the recordable sheet P by performing a recording pass, in which the inkjet head 12 is controlled to discharge the ink though the nozzles 10 while the carriage 11 is moved in the scanning direction, and a conveying action, in which the conveyer roller 13 and the ejection rollers 16 are driven to convey the recordable sheet P, alternately. The image recorder 2 may perform a bidirectional recording, in which the inkjet head 12 may discharge the ink through the nozzles 10 when the carriage 11 is moved either in one way, e.g., leftward, or the other way, e.g., rightward.

<Image Reader>

Figure 5:
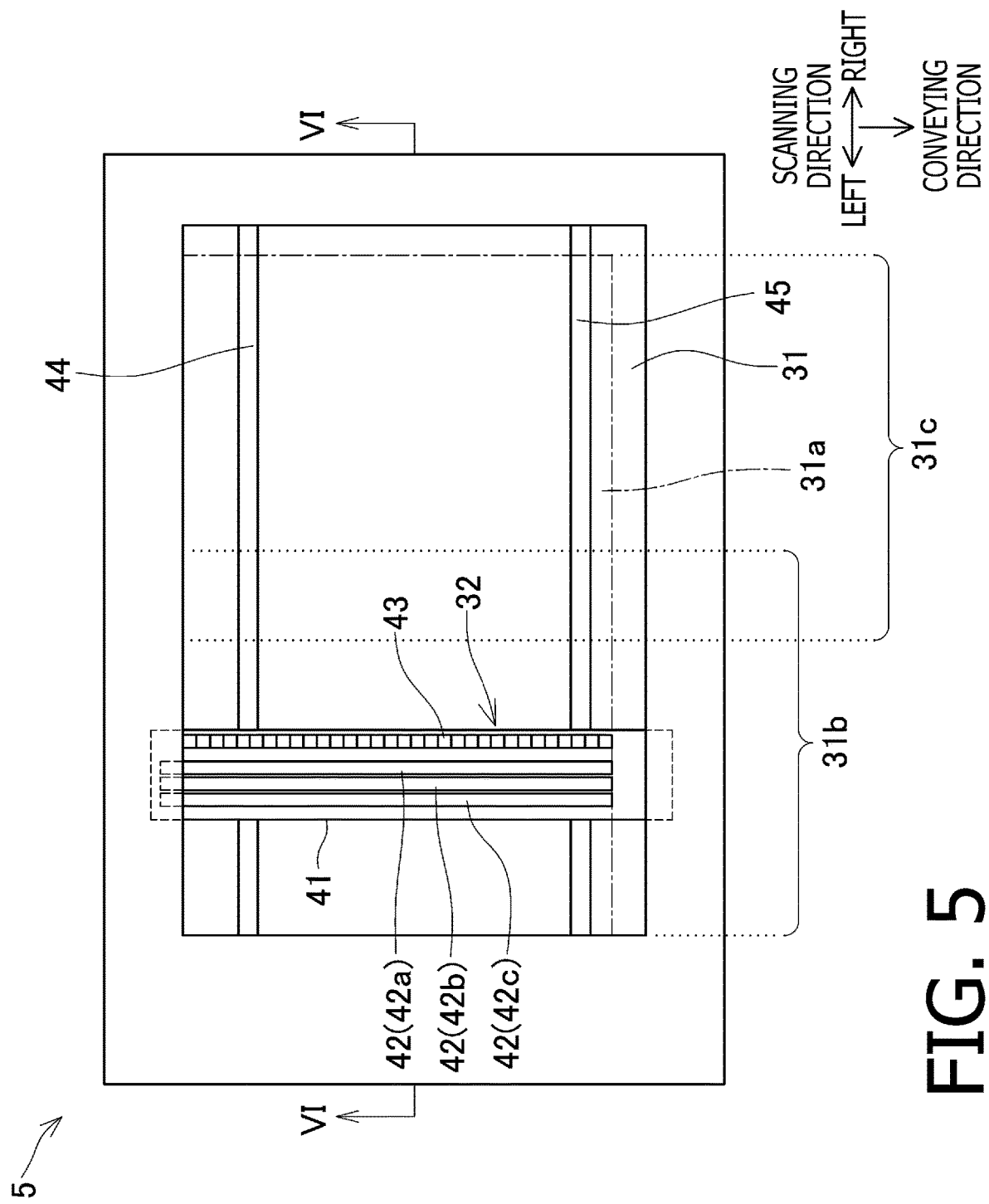
FIG. 5 is a top plan view of a placement table in an image reader according to the embodiment of the present disclosure.
Figure 6:
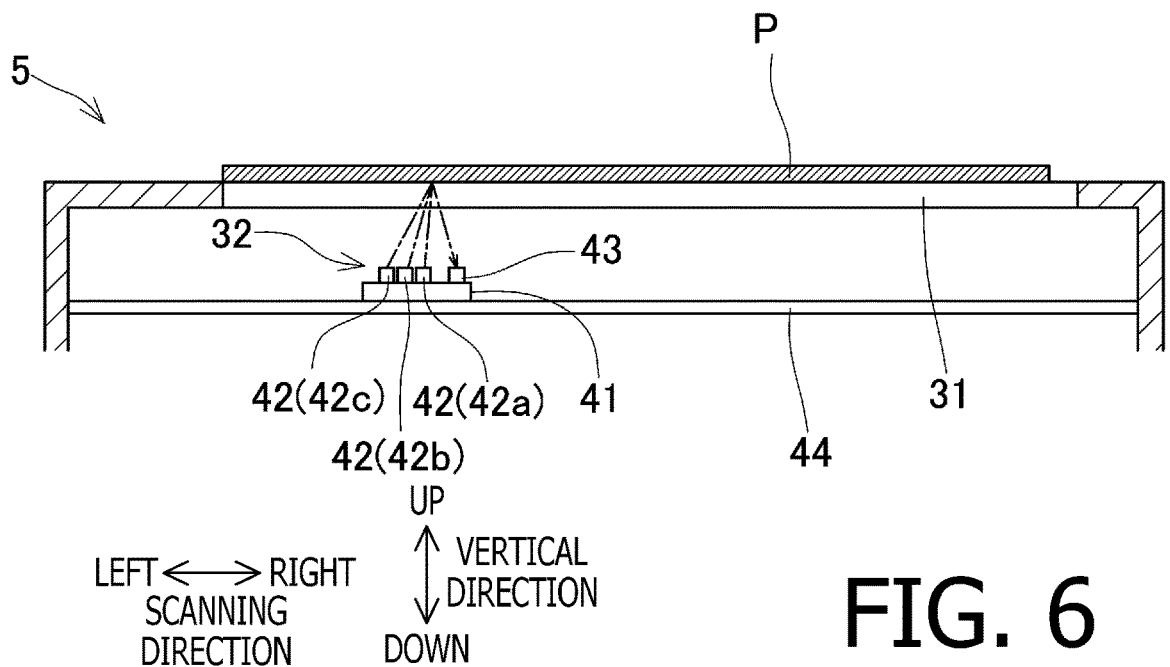
FIG. 6 is a cross-sectional view of the image reader at a section along a line VI-VI shown in FIG. 5 according to the embodiment of the present disclosure.

Next, the image reader 5 will be described. As shown in FIGS. 1, 5, and 6, the image reader 5 includes a placement table 31 and a reader 32. The placement table 31 includes a transparent plate member, such as a glass plate, having a rectangular shape, of which longer sides extend in the scanning direction, in a plan view. At a position above the placement table 31, a cover 33 is arranged. The cover 33 is swingable about a swing axis 33a, which is located at an end thereof on an upstream side in the conveying direction and extends in parallel with the scanning direction. The cover 33 may be moved to swing about the swing axis 33a between a position, at which the cover 33 covers the placement table 31, and a position, at which the placement table 31 is exposed uncovered. When the cover 33 is at the position to expose the placement table 31, the recordable sheet P with the image recorded thereon may be placed on an upper surface of the placement table 31. The reader 32 may read an image of the recordable sheet P within a readable area 31a, which is an area on the upper surface of the placement table 31 excluding an end area on a downstream side in the conveying direction and a rightward end area in the scanning direction, as indicated in a dash-and-dot line FIG. 5.

The reader 32 is arranged below the placement table 31. The reader 32 includes a carriage 41, a light source 42, including three (3) light sources 42a, 42b, 42c, and a plurality of light receivers 43.

The carriage 41 is supported by guide rails 45, 46 extending in the scanning direction. The carriage 41 is connected to a carriage motor 58 (see FIG. 7) through a belt (not shown). By activating the carriage motor 58, the carriage 41 may move in the scanning direction along the guide rails 45, 46. In particular, the carriage 41 may move in the scanning direction in an area vertically overlapping the placement table 31, in particular, in an area overlapping the readable area 31a in the vertical direction.

The three light sources 42a, 42b, 42c are mounted on the carriage 41. Each of the light sources 42a, 42b, 42c extends longitudinally over the entire length of the readable area 31a in the conveying direction. The light sources 42a, 42b, 42c are arranged to adjoin one another along the scanning direction in this recited order from right to left. The light sources 42a, 42b, 42c may emit light in colors of red, green, and blue, respectively at the placement table 31.

The plurality of light receivers 43 are mounted on the carriage 41 and arranged to adjoin one another along the conveying direction over the entire length of the readable area 31a in the conveying direction. The light receivers 43 may receive reflection of the light emitted from the light sources 42a, 42b, 42c and reflected on the recordable sheet P placed on the upper surface of the placement table 31. Moreover, the light receivers 43 may output signals according to amounts of the received light.

In the reader 32, while the light is being emitted from at least one of the light sources 42a, 42b, 42c, the carriage 41 may be moved in a direction along the scanning direction, e.g., from left to right. Thus, the light receivers 43 may receive the light, of which amount corresponds to the image recorded on the recordable sheet P, and output the signals corresponding to the amount of the received light. Thereby, the reader 32 may read the image recorded on the recordable sheet P placed on the placement table 31.

<Controller>

Next, explanation of the controller 50 for controlling operations and processes in the multifunction peripheral machine 1 will be provided below. The controller 50 includes, as shown in FIG. 7, a central processing unit (CPU) 51, a read-only memory (ROM) 52, a random access memory (RAM) 53, a flash memory 54, and an application specific integrated circuit (ASIC) 55.

The controller 50 may control actions of the carriage motor 56, the inkjet head 12, the conveyer motor 57, the carriage motor 58, the light sources 42a, 42b, 42c, and the display 6. Further, the controller 50 may receive signals from the light receivers 43 and signals corresponding to operations input by a user through the operation interface 7. In FIG. 7, it may be noted that, for easier illustration, the light source 42 representing the light sources 42a, 42b, 42c and the light receiver 43 representing the plurality of light receivers 43 are shown in singular forms.

Figure 7:
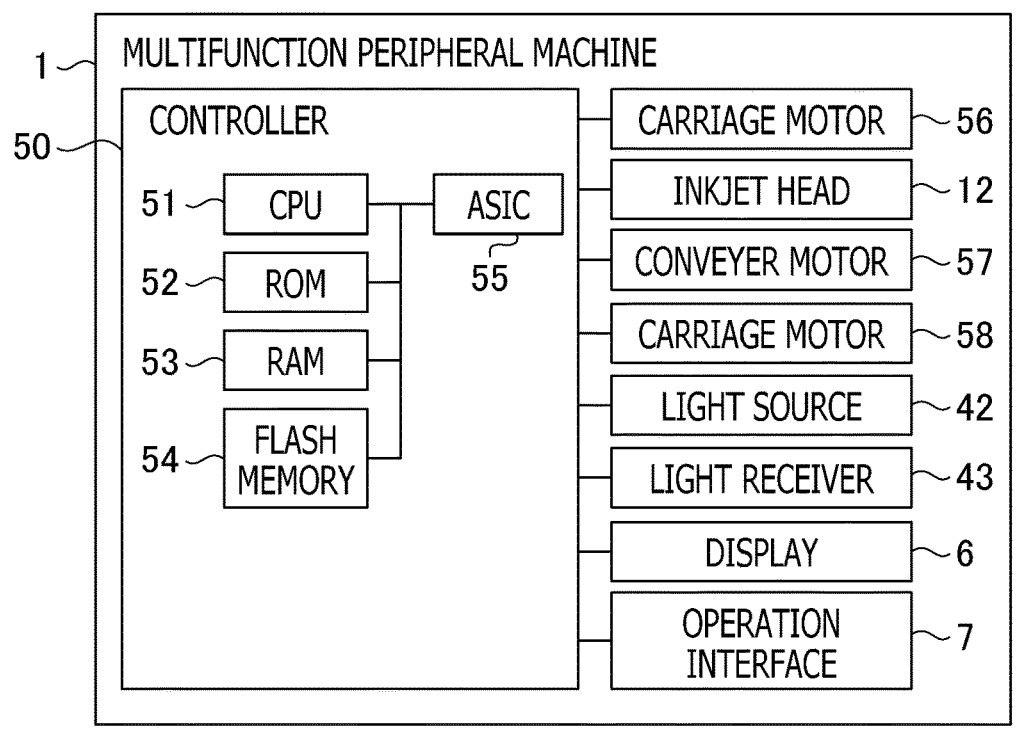
FIG. 7 is a block diagram to illustrate an electrical configuration of the multifunction peripheral machine according to the embodiment of the present disclosure.

While FIG. 7 shows solely one (1) CPU 51 to process the signals in the controller 50, the CPU 51 may not necessarily be limited to a single CPU 51 that processes the signals alone but may include a plurality of CPUs 51 that may share the loads of the signal-processing. Further, the ASIC 55 in the controller 50 may not necessarily be limited to a single ASIC that processes the signals alone but may include multiple ASICs 55 that may share the loads of the signal-processing.

<Test Patterns>

Figure 8:
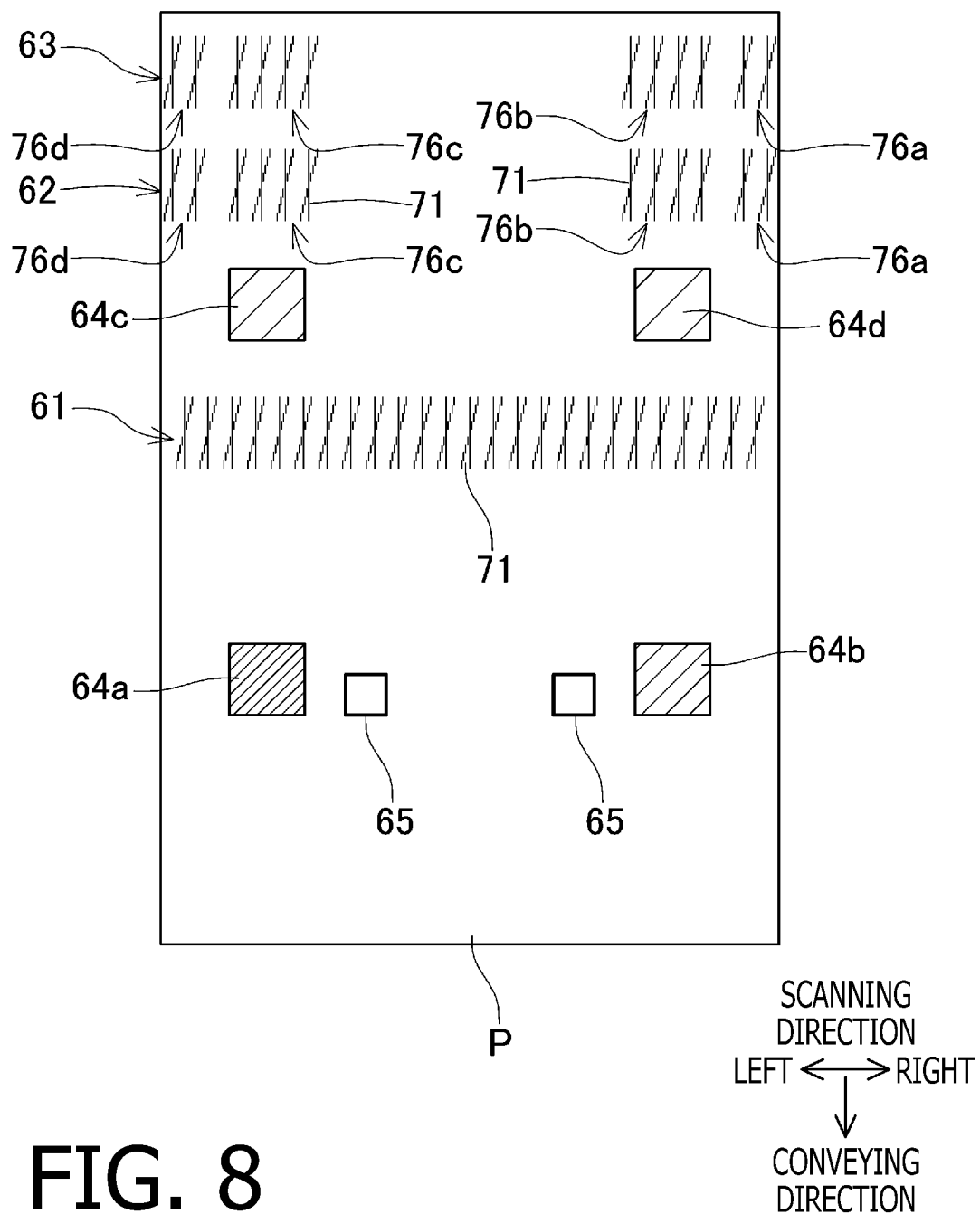
FIG. 8 shows test patterns readable by the image reader in the multifunction peripheral machine according to the embodiment of the present disclosure.

Next, test patterns recordable by the image recorder 2 in the multifunction peripheral machine 1 will be described below. The image recorder 2 may record test patterns, as shown in FIG. 8, including first through third timing adjuster patterns 61-63, four (4) evenness adjuster patterns 64a-64d, and markers 65, by alternately repeating the recording pass and the conveying action under the control of the controller 50. The scanning direction and the conveying direction shown in FIG. 8 coincide with the scanning direction and the conveying direction when the image recorder 2 records the test patterns. Data to be used for recording the test patterns may be stored in, for example, the flash memory 54.

<Timing Adjuster Patterns>

The first timing adjuster pattern 61 may be recorded in the black ink at a central area in the conveying direction on the recordable sheet P. The first timing adjuster pattern 61 is a test pattern ranging longitudinally over the entire length of the recordable sheet P in the scanning direction and includes a plurality of pattern pieces 71 aligning along the scanning direction.

Figure 9:
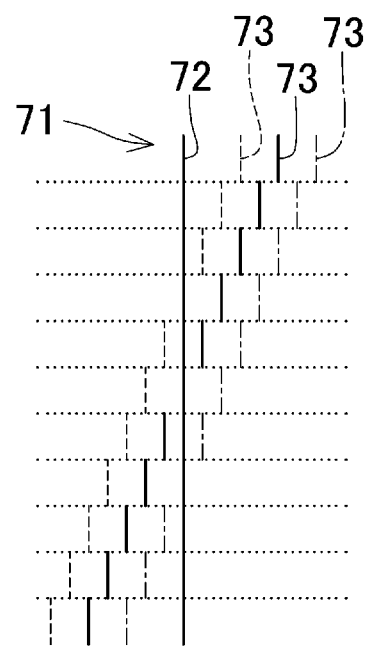
FIG. 9 illustrates an enlarged view of one of pattern pieces shown in FIG. 8 recordable in the multifunction peripheral machine according to the embodiment of the present disclosure.

As shown in FIG. 9, each pattern piece 71 includes a plurality of first linear segments 72 and a plurality of second linear segments 73. The first linear segments 72 are lines extending in parallel with the conveying direction and recorded in recording passes, in which the ink is discharged from the inkjet head 12 through the nozzles 10 while the carriage 11 is moving in one way, e.g., leftward. Each time a recording pass is performed and before performing a next recording pass, the conveying action may be performed; thereby, the first linear segments 72 may be recorded on different positions in the conveying direction on the recordable sheet P. Moreover, in each pattern piece 71 among the plurality of pattern pieces 71, the ink to record the first linear segment 72 is discharged at a same timing. Therefore, the plurality of first linear segments 72 aligning along the conveying direction may form a single piece of line extending in parallel with the conveying direction.

The second linear segments 73 are lines extending in parallel with the conveying direction and recorded in the ink discharged from the inkjet head 12 through the nozzles 10 that are the same nozzles 10 as the nozzles 10 used to record the first linear segments 71 while the carriage 11 is moving in the other way, e.g., rightward. Each of the second linear segments 73 is paired with a different one of the first linear segments 72 and is located at a same position in the conveying direction as the paired one of the first linear segments 72. Meanwhile, among the plurality of second linear segments 73 in the same pattern piece 71, the ink to record each second linear segment 73 is discharged at a different timing. Therefore, among the plurality of pairs of the first linear segment 72 and the second linear segment 73, timings to discharge the ink from the nozzles 10 to record the second linear segment 73 relative to the timing to discharge the ink from the nozzles 10 to record the first linear segment 72 is different.

The first linear segments 72 and the second linear segments 73 in each pattern piece 71 may be recorded according to an arrangement such that, when the nozzles 10 and the recordable sheet P are spaced apart from each other by a predetermined distance, one of the first linear segments 72 located at a center in the conveying direction and the paired one of the second linear segments 73 located at the center in the conveying direction overlap each other, as drawn in solid lines in FIG. 9.

In this arrangement, when the nozzles 10 and the recordable sheet P are spaced apart from each other by a distance smaller than the predetermined distance, a time length since the nozzles 10 discharge the ink at the recordable sheet P until the discharged ink lands on the recordable sheet P may be shorter than a time length since the nozzles 10 discharge the ink at the recordable sheet P until the discharged ink lands on the recordable sheet P when the nozzles 10 and the recordable sheet P are spaced apart from each other by the predetermined distance. Therefore, the first linear segments 72 may be displaced rightward, and the second linear segments 73 may be displaced leftward. Therefore, as drawn in broken lines in FIG. 9, the second linear segments 73 may be displaced leftward with respect to the second linear segments 73 drawn in the solid lines, and one of the first linear segments 72 and the paired one of the second linear segments 73 overlap each other at a position on an upstream side in the conveying direction from the one of the first linear segments 72 and the paired one of the second linear segments 73 located at the center in the conveying direction. In this regard, the larger the difference between the predetermined distance and the distance between the nozzles 10 and the recordable sheet P is, in the farther upstream position in the conveying direction the first linear segment 72 and the second linear segment 73 overlap each other.

On the other hand, when the nozzles 10 and the recordable sheet P are spaced apart from each other by a distance larger than the predetermined distance, a time length since the nozzles 10 discharge the ink at the recordable sheet P until the discharged ink lands on the recordable sheet P may be longer than the time length since the nozzles 10 discharge the ink at the recordable sheet P until the discharged ink lands on the recordable sheet P when the nozzles 10 and the recordable sheet P are spaced apart from each other by the predetermined distance. Therefore, the first linear segments 72 may be displaced leftward, and the second linear segments 73 may be displaced rightward. Therefore, as drawn in dash-and-dot lines in FIG. 9, the second linear segments 73 may be displaced rightward with respect to the second linear segment 73 drawn in the solid lines, and one of the first linear segments 72 and the paired one of the second linear segments 73 overlap each other at a position on a downstream side in the conveying direction from the ne of the first linear segments 72 and the paired one of the second linear segments 73 located at the center in the conveying direction. In this regard, the larger the difference between the predetermined distance and the distance between the nozzles 10 and the recordable sheet P is, in the farther downstream position in the conveying direction the first linear segment 72 and the second linear segment 73 overlap each other.

Thus, by observing which one of the first linear segments 72 and the second linear segments 73 in each pattern piece 71 overlap, the distance between the nozzles 10 and the recordable sheet P may be recognized. In other words, the first timing adjuster pattern 61 may reflect the difference between the discharging timings to discharge the ink in a recording pass when the carriage 11 is moved leftward along the scanning direction and in a recording pass when the carriage 11 is moved rightward along the scanning direction at each position in the scanning direction on the recordable sheet P. Therefore, based on the observation, discharging timings to discharge the ink in the recording pass when the carriage 11 is moved leftward along the scanning direction and in the recording pass when the carriage 11 is moved rightward along the scanning direction may be separately adjusted.

The second timing adjuster pattern 62 may be recorded on the recordable sheet P on an upstream side from the first timing adjuster pattern 61 in the conveying direction. The second timing adjuster pattern 62 includes, similarly to the first timing adjuster pattern 61, a plurality of pattern pieces 71 recorded in the black ink and aligning along the scanning direction. While the first timing adjuster pattern 61 ranges over the entire length of the recordable sheet P in the scanning direction, the second timing adjuster pattern 62 is different from the first timing adjuster pattern 61 in that the second timing adjuster pattern 62 includes four (4) groups 76a-76d arranged to be spaced apart from one another along the scanning direction. In each of the groups 76a-76d, two or more pattern pieces 71 align along the scanning direction. Optionally, in an area on the recordable sheet P between the group 73b and the group 73c in the scanning direction, a test pattern different from the timing adjuster patterns 61-63 may be recorded.

The groups 76a, 76b, 76c, 76d are arranged in this recited order from right to left along the scanning direction. In particular, the group 76a is located in a rightward end area in the scanning direction on the recordable sheet P, and the group 76d is located in a leftward end area in the scanning direction non the recordable sheet P.

The third timing adjuster pattern 63 may be a test pattern recorded, similarly to the second timing adjuster pattern 62, in the black ink on the recordable sheet P on an upstream side from the second timing adjuster pattern 62 in the conveying direction.

The recordable sheet P conveyed by the conveyer roller 13 and the ejection rollers 16 in the conveying direction may be in one of conditions shown in FIGS. 10A-10D. In the condition shown in FIG. 10A, an end of the recordable sheet P on a downstream side in the conveying direction has not reached the ejection rollers 16; therefore, the recordable sheet P is nipped by the conveyer roller 13 but is not nipped by the ejection rollers 16.

The recordable sheet P conveyed downstream from the position shown in FIG. 10A may reach the ejection rollers 16 as shown in FIG. 10B. That is, in the condition shown in FIG. 10B, the recordable sheet P is nipped both by the conveyer roller 13 and the ejection rollers 16.

As the recordable sheet P is conveyed further downstream from the position shown in FIG. 10B, an end of the recordable sheet P on an upstream side in the conveying direction may leave the conveyer roller 13 and may be located on a downstream side of the conveyer roller 13 in the conveying direction. That is, in the condition shown in FIG. 10C, the recordable sheet P is not nipped by the conveyer roller 13 but is nipped by the ejection rollers 16.

In the conditions shown in FIGS. 10A-10C, the recordable sheet P may be pressed by the pressers 14a from above. As the recordable sheet P is conveyed downstream from the position shown in FIG. 10C, the upstream end of the recordable sheet P may be located downstream from the pressers 14a in the conveying direction, as shown in FIG. 10D. In the condition shown in FIG. 10D, the recordable sheet P is not nipped by the conveyer roller 13 but is nipped by the ejection rollers 16, and is not pressed by the pressers 14a.

Therefore, the corrugated shape of the recordable sheet P may vary depending on the condition of the recordable sheet P among the conditions shown in FIGS. 10A, 10B, the condition shown in FIG. 10C, and the condition shown in FIG. 10D. The first timing adjuster pattern 61 may be recorded in an area, which faces the nozzles 10 of the inkjet head 12, on the recordable sheet P in the condition shown in FIG. 10B. The second timing adjuster pattern 62 may be recorded in an area, which faces the nozzles 10 of the inkjet head 12, on the recordable sheet P in the condition shown in FIG. 10C. The third timing adjuster pattern 63 may be recorded in an area, which faces the nozzles 10 of the inkjet head 12, on the recordable sheet P in the condition shown in FIG. 10D.

Therefore, based on recorded outcomes of the first through third timing adjuster patterns 61-63, the discharging timings to discharge the ink from the nozzles 10 in a recording pass, in which the carriage 11 is moved rightward in the scanning direction, and the discharging timings to discharge the ink through the nozzles 10 in a recording pass, in which the carriage 11 is moved leftward in the scanning direction, may be separately adjusted.

Meanwhile, with regard to the second and third timing adjuster patterns 62, 63, in areas between the groups 76a, 76b, between the groups 76b, 76c, and between the groups 76c, 76d, which adjoin in the scanning direction, no pattern piece 71 is recorded. However, based on a difference between recorded outcome of pattern pieces 71 in the second and third timing adjuster patterns 62, 63 and recorded outcome of the pattern pieces 71 in the first timing adjuster pattern 61 at the same positions in the scanning direction, and on the discharging timings in the recording passes to record the first timing adjuster pattern 61 under the condition shown in FIG. 10B, obtained from the recorded outcome of the pattern pieces 71, the discharging timings to discharge the ink from the nozzles 10 in a recording pass, in which the carriage 11 is moved leftward through the entire length along the scanning direction, and in a recording pass, in which the carriage 11 is moved rightward through the entire length along the scanning direction, when the recordable sheet P is in the conditions shown in FIGS. 10C and 10D and may be correctly adjusted.

<Evenness Adjuster Patterns>

The evenness adjuster patterns 64a, 64b may be recorded in areas on the recordable sheet P on a downstream side from the first adjuster pattern 61 in the conveying direction. The evenness adjuster patterns 64a, 64b are plain color-filled figures recorded in the black ink and the cyan ink, respectively. A color difference between black, which is the color to fill the evenness adjuster pattern 64a, and red, which is a color of the light emitted from the light source 42a, is equal to or greater than a predetermined value. A color difference between black and blue being a color of the light emitted from the light source 42c is smaller than the predetermined value. A color difference between cyan, which is the color to fill the evenness adjuster pattern 64b, and red, which is the color of the light emitted from the light source 42a, is equal to or greater than the predetermined value. A color difference between cyan and blue being the color of the light emitted from the light source 42c is smaller than the predetermined value.

The evenness adjuster patterns 64c, 64d may be recorded in areas between the first timing adjuster pattern 61 and the second timing adjuster pattern 62 in the conveying direction. The evenness adjuster patterns 64c, 64d are plain color-filled figures recorded in the yellow ink and the magenta ink, respectively. A color difference between yellow, which is the color to fill the evenness adjuster pattern 64c, and red, which is the color of the light emitted from the light source 42a, is smaller than the predetermined value. A color difference between yellow and blue being the color of the light emitted from the light source 42c is equal to or greater than the predetermined value. A color difference between magenta, which is the color to fill the evenness adjuster pattern 64d, and red, which is the color of the light emitted from the light source 42a, is smaller than the predetermined value. A color difference between magenta and blue being the color of the light emitted from the light source 42c is equal to or greater than the predetermined value.

In each of the evenness adjuster patterns 64a-64d, an area closer to the upstream end thereof consists of dots formed in the inks discharged from the nozzles 10, which are located upstream in the conveying direction, and an area farther from the upstream end thereof consists of dots formed in the inks discharged from the nozzles 10, which are located downstream in the conveying direction. Therefore, based on a difference between the areas at different positions in the conveying direction within each of the evenness adjuster patterns 64a-64d, amounts of the inks to be discharged from the nozzles 10 may be adjusted.

<Marker>

The markers 65 will be herein described. Each marker 65 may be a rectangular frame recorded in the black ink and may be recorded on a downstream side from the first timing adjuster pattern 61 in the conveying direction. In FIG. 8, the test patterns include two (2) markers 65; however, a quantity of the marker(s) 65 may be not be limited to two but may be one (1), three (3), or more. Moreover, the shape of the marker 65 may not necessarily be limited to square.

<Processes to Adjust Settings in the Image Recorder>

Next, a flow of processes to adjust the settings in the image recorder 2, including timings to discharge the ink from the nozzles 10 in recording passes, amounts to discharge the ink through the nozzles 10, will be described below. The controller 50 may conduct the processes according to the flows shown in FIGS. 11A-11B to adjust the settings. For example, a program containing instructions to cause the controller 50 to conduct the processes shown in FIGS. 11A-11B may be stored in the ROM 52. The controller 50 may start the processes when instructed by a user through, for example, the operation interface 7.

According to the flow shown in FIGS. 11A-11B, in S101, the controller 50 controls the carriage motor 56, the inkjet head 12, the conveyer motor 57, and the feeder 3 in the image recorder 2 to record the test patterns as shown in FIG. 8 on the recordable sheet P.

After the test patterns are recorded on the recordable sheet P, in S102, the controller 50 controls the display 6 to display a message advising the user to set the recordable sheet P with the recorded test patterns thereon on the placement table 31. In particular, the message may advise the user to set the recordable sheet P on the placement table 31 in a predetermined orientation such that the surface of the recordable sheet P, on which the test patterns are recorded, faces downward, i.e., toward the placement table 31, and an edge of the recordable sheet P on the downstream side when the test pattern was being recorded is located leftward in the scanning direction, at a position, in which a corner of the recordable sheet P between the leftward edge in the scanning direction and an upstream edge in the conveying direction fits with a corner of the placement table 31 between a leftward edge in the scanning direction and an upstream edge in the conveying direction. Moreover, the controller 50 controls the display 6 to display a message instructing the user to perform a predetermined operation through the operation interface 7 after setting the recordable sheet P on the image reader 5.

In S103, the controller 50 awaits until a set-completion signal, which indicates that setting the recordable sheet P with the test pattern recorded thereon is completed, is received in accordance with the user's predetermined operation through the operation interface 7 (S103: NO). When the set-completion signal is received (S103: YES), in S104, the controller 50 controls the light source 42a to emit the red light to place the recordable sheet P on the placement table 31 in a red-light emitted state by the red light, and in S105, controls the carriage motor 58 to start moving the carriage 41 and the reader 32 to start reading the test patterns.

In S106, the controller 50 continues reading the test pattern until the reader 32 reads a first readable area 31b, which is an approximately half of the readable area 31a on a leftward side in the scanning direction, completely (S106: NO). When the reader 32 completes reading the first readable area 31b (S106: YES), in S107, the controller 50 controls the carriage motor 58 to stop the carriage 41 and controls the reader 32 to stop reading the test patterns.

In S108, the controller 50 determines whether read data generated from the signals received from the light receiver 43 based on the outcome of reading so far by the reader 32 includes data corresponding to the first timing adjuster pattern 61. In particular, the flash memory 54 may store information concerning the first timing adjuster pattern 61. The information concerning the first adjuster pattern 61 may include, for example, information concerning a location of the first timing adjuster pattern 61 on the recordable sheet P, when the recordable sheet P in the predetermined orientation is at the position, in which the corner of the recordable sheet P between the leftward edge in the scanning direction and the upstream edge in the conveying direction fits with the corner of the placement table 31 between the leftward edge in the scanning direction and the upstream edge in the conveying direction, and information concerning a range of amounts of the light to be received by the light receiver 43 when the light source 42a emits the red light at the first timing adjuster pattern 61. In S108, therefore, the controller 50 may determine whether the read data includes the data for the first timing adjuster pattern 61 based on the read data and the information concerning the first adjuster pattern 61. In the paragraphs below, the arrangement of the recordable sheet P with the test patterns recorded thereon, when the recordable sheet P in the predetermined orientation is at the position in which the corner of the recordable sheet P between the leftward edge in the scanning direction and the upstream edge in the conveying direction fits with the corner of the placement table 31 between the leftward edge in the scanning direction and the upstream edge in the conveying direction, may be expressed as "the recordable sheet P with the test patterns recorded thereon being placed on the placement table 31 correctly."

When the recordable sheet P with the test patterns recorded thereon is placed on the placement table 31 correctly, the first timing adjuster pattern 61 on the recordable sheet P is located in an area on the recordable sheet P, which overlaps a rightward end portion of the first readable area 31b. A position of the rightward end portion of the first readable area 31b in the scanning direction may be called as a stopping position, at which the reader 32 stops reading in S107. Therefore, when the recordable sheet P with the test patterns recorded thereon is placed on the placement table 31 correctly, the first timing adjuster pattern 61 is located at the stopping position in the scanning direction. Optionally, when the recordable sheet P with the test pattern recorded thereon is placed on the placement table 31 correctly, the first timing adjuster pattern 61 may be located at a position leftward with respect to the stopping position in the scanning direction.

Moreover, when the recordable sheet P with the test patterns recorded thereon is placed on the placement table 31 correctly, the evenness adjuster patterns 64a, 64b are located at a position leftward from the stopping position in the scanning direction. Optionally, when the recordable sheet P with the test pattern recorded thereon is placed on the placement table 31 correctly, the evenness adjuster patterns 64a, 64b may be located at the stopping position.

In S108, when the read data does not include the data for the first timing adjuster pattern 61 (S108: NO), in S109, the controller 50 aborts reading the test patterns. In particular, the controller 50 may control the light source 42a to stop emitting the red light and control the carriage motor 58 to move the carriage 41 to return to a position overlapping a leftward end portion of the placement table 31. In S110, the controller 50 outputs an error alerting signal indicating that the read data contains an error to the display 6 and controls the display 6 to display an error message.

In S108, on the other hand, when the read data includes the data for the first timing adjuster pattern 61 (S108: YES), in S111, the controller 50 determines whether the read data includes data for the markers 65. In particular, the flash memory 54 may store information concerning the markers 65. The information concerning the markers 65 may include, for example, information concerning locations of the markers 65 on the recordable sheet P, when the recordable sheet P with the test patterns recorded thereon is placed on the placement table 31 correctly, and information concerning a range of amounts of the light to be received by the light receiver 43 when the light source 42a emits the red light at the markers 65. In S111, therefore, the controller 50 may determine whether the read data includes the data for the markers 65 based on the read data and the information concerning the markers 65.

When the recordable sheet P with the test patterns recorded thereon is placed on the placement table 31 correctly, the markers 65 on the recordable sheet P are located in an area on the recordable sheet P, which overlaps a leftward end portion of the first readable area 31b. Therefore, when the recordable sheet P with the test patterns recorded thereon is placed on the placement table 31 correctly, the markers 65 are located at a position leftward with respect to the stopping position in the scanning direction. Optionally, when the recordable sheet P with the test patterns recorded thereon is placed on the placement table 31 correctly, the markers 65 may be located at the stopping position.

In S111, when the read data does not include the data for the markers 65 (S111: NO), in S109, the controller 50 aborts reading the test patterns. In particular, the controller 50 may control the light source 42a to stop emitting the red light and control the carriage motor 58 to move the carriage 41 to return to the position overlapping the leftward end portion of the placement table 31. In S110, the controller 50 outputs an error alerting signal indicating that the read data contains an error to the display 6 and controls the display 6 to display an error message.

Thus, the action by the reader 32 to read the test patterns may be continued without being aborted on the condition that the read data contains the data for the first timing adjuster pattern 64 and the markers 65.

In S111, when the read data includes the data for the markers 65 (S111: YES), in S112, the controller 50 controls the light source 42a to stop emitting the red light and the light source 42c to start emitting the blue light to place the recordable sheet P on the placement table 31 in a blue-light emitted state by the blue light. Thus, in S112, while the reader 32 pauses to stop reading the test patterns, the red-light emitted state, in which the recordable sheet P is illuminated by the red light, shifts to the blue-light emitted state, in which the recordable sheet P is illuminated by the blue light.

In S113, the controller 50 controls the carriage motor 58 to resume moving and the reader 32 to resume reading the test patterns.

In S114, the controller 50 continues reading the test patterns until the reader 32 reads a second readable area 31c, which is approximately the other half of the readable area 31a on a rightward side in the scanning direction as shown in FIG. 5, completely (S114: NO). In order to reliably read the recordable sheet P on the placement table 31 entirely, a rightward end portion of the first readable area 31b may overlap a leftward end portion of the second readable area 31c.

When the reader 32 completes reading the second readable area 31c (S114: YES), in S115, the controller 50 controls the light source 42b to stop emitting the blue light. In S116, the controller 50 determines whether the read data generated from the signals received from the light receiver 43 based on the outcome of reading so far by the reader 32 includes data for the second and third timing adjuster patterns 62, 63. In particular, the flash memory 54 may store information concerning the second and third timing adjuster patterns 62, 63. The information concerning the second and third adjuster patterns 62, 63 may include, for example, information concerning locations of the second and third timing adjuster patterns 62, 63 on the recordable sheet P, when the recordable sheet P in the predetermined orientation is placed on the placement table 31 correctly, and information concerning a range of amounts of the light to be received by the light receiver 43 when the light source 42c emits the blue light at the second and third timing adjuster patterns 62, 63. In S116, therefore, the controller 50 may determine whether the read data includes the data for the second and third timing adjuster patterns 62, 63 based on the read data and the information concerning the second and third adjuster patterns 62, 63.

When the recordable sheet P with the test patterns recorded thereon is placed on the placement table 31 correctly, the second and third timing adjuster patterns 62, 63 on the recordable sheet P are located in an area on the recordable sheet P, which overlaps a rightward end portion of the second readable area 31c. Therefore, when the recordable sheet P with the test patterns recorded thereon is placed on the placement table 31 correctly, the second and third timing adjuster patterns 62, 63 are located at a position rightward with respect to the stopping position in the scanning direction.

Moreover, when the recordable sheet P with the test patterns recorded thereon is placed on the placement table 31 correctly, the evenness adjuster patterns 64a, 64b are located at a position rightward from the stopping position in the scanning direction.

In S116, when the read data does not include the data for the second or third timing adjuster pattern 62, 63 (S116: NO), in S109, the controller 50 aborts reading the test patterns, and in S110, outputs an error alerting signal indicating that the read data contains an error to the display 6 and controls the display 6 to display an error message.

In S116, on the other hand, when the read data includes the data for the second and third timing adjuster patterns 62, 63 (S116: YES), in S117, the controller 50 conducts an adjusting process. In particular, based on the first through third timing adjuster patterns 61-63 included in the read data, the controller 50 may adjust the discharging timings to discharge the ink from the nozzles 10 while the carriage 11 is moved leftward and rightward along the scanning direction in the recording passes for each of the conditions of the recordable sheet P as shown in FIGS. 10B-10D. Moreover, based on the data for the evenness adjuster patterns 64a-64d included in the read data, the controller 50 may adjust the amounts of the ink to be discharged from the nozzles 10 in the inkjet head 12.

<Examples of Outcomes of the Processes>

Next, examples of outcomes of the processes through the flows shown in FIGS. 11A-11B will be herein described. For example, when the user sets the recordable sheet P with the test patterns recorded thereon on the placement table 31 correctly, in other words, when the recordable sheet P with the test patterns recorded thereon is placed on the placement table 31 in the predetermined orientation at the position, in which the corner of the recordable sheet P between the leftward edge in the scanning direction and the upstream edge in the conveying direction fits with the corner of the placement table 31 between the leftward edge in the scanning direction and the upstream edge in the conveying direction, as shown in FIG. 12A, the first timing adjuster pattern 61 and the markers 65 are located within the first readable area 31b (S108: YES, S111: YES). Moreover, the second and third timing adjuster patterns 62, 63 are located within the second readable area 31c (S116: YES). Therefore, the controller 50 may conduct the adjusting process (S117).

It may be noted that in FIGS. 12A-12D and FIGS. 13A-13C, for easier illustration, the test patterns recorded on the downward surface of the recordable sheet P (i.e., a farther side in FIGS. 12A-12D and FIGS. 13A-13C to a viewer), which may be drawn in broken lines, when the recordable sheet P is placed on the placement table 31 in the predetermined orientation, are drawn in solid lines.

Meanwhile, for example, when the user erroneously sets the recordable sheet P with the test patterns recorded thereon on the placement table 31 in the predetermined orientation but at a position, in which a corner of the recordable sheet P between the rightward edge in the scanning direction and the upstream edge in the conveying direction fits with a corner of the placement table 31 between a rightward edge in the scanning direction and the upstream edge in the conveying direction, as shown in FIG. 12B, the recordable sheet P is at a displaced position rightward with respect to the position shown in FIG. 12A. Therefore, the first timing adjuster pattern 61 is not located within the first readable area 31b (S108: NO). Accordingly, with the recordable sheet P in this position, the controller 50 may not conduct the adjusting process.

For another example, when the user erroneously sets the recordable sheet P with the test patterns recorded thereon on the placement table 31 in the predetermined orientation but at a position, in which a corner of the recordable sheet P between the leftward edge in the scanning direction and the downstream edge in the conveying direction fits with a corner of the placement table 31 between a leftward edge in the scanning direction and the downstream edge in the conveying direction, as shown in FIG. 12C, the recordable sheet P is at a displaced position downstream in the conveying direction with respect to the position shown in FIG. 12A. Therefore, a part of the first timing adjuster pattern 61 on the downstream side in the conveying direction is not located in the first readable area 31b (S108: NO). Accordingly, with the recordable sheet P in this position, the controller 50 may not conduct the adjusting process.

Meanwhile, the first timing adjuster pattern 61 is arranged over the entire length of the recordable sheet P in the conveying direction in the state where the recordable sheet P is placed on the placement table 31. Therefore, in S108, there may be cases that the first timing adjuster pattern 61 is located within the first readable area 31b. Meanwhile, however, the group 76d in the second and third timing adjuster patterns 62, 63 is not located within the second readable area 31c (S116: NO). Therefore, with the recordable sheet P in this position shown in FIG. 12C, the controller 50 may not conduct the adjusting process.

For another example, when the user erroneously sets the recordable sheet P with the test patterns recorded thereon on the placement table 31 in the predetermined orientation but at a position, in which a corner of the recordable sheet P between the rightward edge in the scanning direction and the downstream edge in the conveying direction fits with a corner of the placement table 31 between a rightward edge in the scanning direction and the downstream edge in the conveying direction, as shown in FIG. 12D, the recordable sheet P is at a displaced position rightward in the scanning direction and downstream in the conveying direction with respect to the position shown in FIG. 12A. Therefore, the first timing adjuster pattern 61 is not located within the first readable area 31b (S108: NO). Accordingly, with the recordable sheet P in this position, the controller 50 may not conduct the adjusting process.

For another example, when the user erroneously sets the recordable sheet P with the test patterns recorded thereon on the placement table 31 at a skewed position, in which the leftward edge of the recordable sheet P is located downstream with respect to the rightward edge in the conveying direction, as shown in FIG. 13A, a part of the first timing adjuster pattern 61 is not located in the first readable area 31b (S108: NO). Accordingly, with the recordable sheet P in this position, the controller 50 may not conduct the adjusting process. It may be noted that FIG. 13A illustrates the recordable sheet P in the position skewed to a maximum extent within a range, in which the entire recordable sheet P stays inside the upper surface of the placement table 31.

In the arrangement shown in FIG. 13A, however, a large number of pattern pieces 71 in the first timing adjuster pattern 61 is located within the first readable area 31b, in particular, the overlapping parts of the pattern pieces 71, in each of which the first linear segment 72 and the second linear segment 73 overlap, are located within the first readable area 31b. Therefore, the data for the first timing adjuster pattern 61 may be corrected suitably, and the discharging timings may still be adjusted for each position in the scanning direction based on the corrected data. In this regard, it may be determined that the first timing adjuster pattern 61 is located within the first readable area 31b even when the recordable sheet P is placed on the placement table 31 in the skewed position as shown in FIG. 13A. When the controller 50 thus determines that the first timing adjuster pattern 61 is located within the first readable area 31b (S108: YES), the markers 65 are located within the first readable area 31b (S111: YES), and the second and third timing adjuster patterns 62, 63 are located within the second readable area 31c (S116: YES); therefore, the controller 50 may conduct the adjusting process.

For another example, when the user erroneously sets the recordable sheet P with the test patterns recorded thereon on the placement table 31 at a skewed position, in which the leftward edge of the recordable sheet P is located upstream with respect to the rightward edge in the conveying direction, as shown in FIG. 13B, a part of the first timing adjuster pattern 61 is not located in the first readable area 31b (S108: NO). Accordingly, with the recordable sheet P in this position, the controller 50 may not conduct the adjusting process. It may be noted that FIG. 13B illustrates the recordable sheet P in the position skewed to a maximum extent within a range, in which the entire recordable sheet P stays inside the upper surface of the placement table 31.

In the arrangement shown in FIG. 13B, similarly to the arrangement in FIG. 13A, a large number of pattern pieces 71 in the first timing adjuster pattern 61 is located within the first readable area 31b, in particular, the overlapping parts of the pattern pieces 71, in each of which the first linear segment 72 and the second linear segment 73 overlap, are located within the first readable area 31b. Meanwhile, however, the group 76d in the second and third timing adjuster patterns 62, 63 is not located in the second readable area 31c (S116: NO). Therefore, when the recordable sheet P is in the arrangement shown in FIG. 13B, even if the first timing adjuster pattern 61 is determined to be located within the first readable area 31b, the controller 50 may not conduct the adjusting process.

For another example, when the user erroneously sets the recordable sheet P with the test patterns recorded thereon on the placement table 31 in an arrangement, in which the recordable sheet P is rotated by 180 degrees from the predetermined orientation shown in FIG. 12A, i.e., in an orientation in which the edge of the recordable sheet P on the downstream side when the test patterns were being recorded is located rightward in the scanning direction, the markers 65 are not located within the first readable area 31b (111: NO). Therefore, the controller 50 may conduct the adjusting process.

Moreover, when the recordable sheet P with the test patterns recorded thereon is placed on the placement table 31 in the arrangement, in which the recordable sheet P is rotated by 180 degrees from the predetermined orientation, and at any of the positions shown in FIGS. 12B-12D and 13A-13B, the markers 65 are not located within the first readable area 31b (S111: NO). Therefore, the controller 50 may conduct the adjusting process.

For another example, when a recordable sheet P with an image other than the test patterns as shown in FIG. 8 recorded thereon or a recordable sheet P with no image recorded thereon is placed on the placement table 31, neither the first timing adjuster pattern 61 nor the markers 65 is located within the first readable area 31b, or the second and third timing adjuster patterns 62, 63 are not located inside the second readable area 31c. Therefore, the controller 50 may conduct the adjusting process.

<Processes for Reading Image Containing No Test Pattern>

Next, a flow of processes to read an image not containing the test patterns by the controller 50 will be described below. For example, in order to create and save image data for an image recorded on a recordable sheet P, or, for another example, in order to duplicate the image recorded on the recordable sheet P on another recordable sheet P, the controller 50 may conduct the processes according to the flow shown in FIG. 14 to control the reader 32 to read the image recorded on the recordable sheet P.

In S201, the controller 50 may control the light sources 42a, 42b, 42c to start emitting the light in the colors of red, green, and blue, respectively. In particular, the light sources 42a-42c are controlled in an order such that a red-light emitted state, in which the red light is emitted from the light source 42a, a green-light emitted state, in which the green light is emitted from the light source 42b, and a blue-light emitted state, in which the blue light is emitted from the light source 42c, are switched sequentially and repeatedly at short time intervals of, for example, a few μm. In S202, the controller 50 controls the carriage 58 and the reader 32 to start moving the carriage 41 and start reading the image. In particular, the light receiver 43 outputs the signals according to amounts of the red light, the green light, and the blue light being received while the red light, the green light, and the blue light are being emitted. The controller 50 controls the reader 32 to continue reading until the readable area 31a is completely read (S203: NO). When the readable area 31a is completely read (S203: YES), in S204, the controller 50 controls the light sources 42a, 42b, 42c to stop emitting the red light, the green light, and the blue light, respectively, and ends the process thereat. Thus, when reading the image not containing the test pattern, the controller 50 controls the reader 32 to continue reading the image without aborting.

<Benefits>

According to the embodiment described above, the reader 32 reading the test patterns may be controlled to stop reading before completely reading the image, and while the reader 32 pauses, the controller 50 may determine whether the read data generated from the signals based on the outcome of reading so far satisfies the predetermined condition. When the read data satisfies the predetermined condition, the controller 50 may control the reader 32 to resume reading the image. On the other hand, when the read data does not satisfy the predetermined condition, the controller 50 may control the reader 32 to abort reading the image, output an error alerting signal, and control the display 6 to display an error message. Thus, when an error factor is found in reading the test patterns, the controller 50 may determine the error while the test patterns are in midst of being read. Therefore, wasteful reading the test pattern after finding the error factor may be avoided.

According to the embodiment described above, when the recordable sheet P with the test patterns recorded thereon is placed on the placement table 31 correctly, the test patterns may be read by the reader 32 correctly until the reader 32 is controlled to stop in midst of reading; therefore, the first timing adjuster pattern 61 and the markers 65 may be read by the reader 32 before the reader 32 pauses. In other words, the read data generated based on the outcome of reading so far by the reader 32 before the reader 32 pauses contains the data for the first timing adjuster pattern 61 and the markers 65.

On the other hand, when the recordable sheet P with the test patterns recorded thereon is placed on the placement table 31 incorrectly, for example, in an arrangement shown in one of FIGS. 12B-12D and FIGS. 13A-13C, the test patterns may not be read by the reader 32 correctly before the reader 32 is controlled to stop reading in the midst of reading; therefore, at least one of the first timing adjuster pattern 61 and the markers 65 may not be read by the reader 32 before the reader 32 pauses. In other words, the read data generated based on the outcome of reading so far by the reader 32 before the reader 32 pauses lacks the data for at least one of the first timing adjuster pattern 61 and the markers 65.

Therefore, in the present embodiment, whether the reader 32 resumes reading the image depends on the predetermined condition that the read data includes the data for all of the first timing adjuster pattern 61 and the markers 65.

In the embodiment described above, the recordable sheet P is deformed in the corrugated shape along the scanning direction, and the distance between the recordable sheet P and the nozzles 10 may vary depending on the position on the recordable sheet P in the scanning direction. Therefore, the discharging timings to discharge the ink from the nozzles 10 at each position in the scanning direction on the recordable sheet P may vary between a recording pass, in which the carriage 11 is moved leftward along the scanning direction, and a recording pass, in which the carriage 11 is moved rightward along the scanning direction. In this regard, the first timing adjuster pattern 61, which may be used for adjusting the discharging timings to discharge the ink from the nozzles 10 in the rightward recording pass and the leftward recording pass separately may need to range over the entire length of the recordable sheet P in the scanning direction.

Therefore, in the embodiment described above, when the reader 32 reads the test pattern recorded on the recordable sheet P, the recordable sheet P may be placed on the placement table 31 in the predetermined orientation such that the direction, which is parallel to the scanning direction when the test patterns are being recorded, aligns in parallel with the conveying direction. While the recordable sheet P is on the placement table 31 in the predetermined orientation, the controller 50 may determine whether the read data, which is generated based on the outcome of reading so far by the reader 32 before the reader 32 pauses, satisfies the condition that the read data contains the data for the first timing adjuster pattern 61 ranging along the conveying direction on the recordable sheet P placed on the placement table 31.

According to the embodiment described above, the corrugated shape of the recordable sheet P may vary depending on the position of the recordable sheet P in the conveying direction when the image is being recorded on the recordable sheet P. Therefore, the test patterns are provided with the second and third timing adjuster patterns 62, 63, separately from the first timing adjuster pattern 61. The second and third timing adjuster patterns 62, 63 may be read when the reader 32 resumes reading on the condition that the recordable sheet P with the test patterns recorded thereon is placed on the placement table 31 correctly. Therefore, additionally to the determination after the reader 32 stops reading in the midst of reading whether the read data contains the data for the first timing adjuster pattern 61, the controller 50 may read the plurality of test patterns completely and thereafter determine whether the read data contains the data for the second and third timing adjuster patterns 62, 63. Thereby, the controller 50 may determine whether the test patterns are correctly read more reliably.

For example, unlike the embodiment described above, if the light sources 42*a*-42*c* are configured such that the red-light emitted state, in which the light source 42*a* emits the red light, shifts to the blue-light emitted state, in which the light source 42*b* emits the blue light, while the reader 32 is reading the test patterns, the test patterns may not be read correctly at the instant when the red-light emitted state shifts to the blue-light emitted state. Therefore, in the embodiment described above, the reader 32 is controlled to stop reading in the midst of reading the test patterns, and while the reader 32 is pausing, the red-light emitted state, in which the light source 42*a* emits the red light, is shifted to the blue-light emitted state, in which the light source 42*b* emits the blue light, and thereafter, the reader 32 is controlled to resume reading the test patterns. Thus, the controller 50 may determine whether the read data satisfies the predetermined condition using the time period, in which the reader 32 is pausing while the red-light emitted state is shifted to the blue-light emitted state, efficiently.

Moreover, while the reader 32 reads an image other than the test patterns, the reader 32 may be controlled to continue reading without pausing. Therefore, a time period for reading the image may be shortened.

<More Examples>

Although an example of carrying out the invention has been described, those skilled in the art will appreciate that there are numerous variations and permutations of the image reading apparatus, the multifunction peripheral machine, the image reading system, the method for reading the test patterns, and the computer-readable storage medium for storing computer-readable instructions for reading the test patterns that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims. In the meantime, the terms used to represent the components in the above embodiment may not necessarily agree identically with the terms recited in the appended claims, but the terms used in the above embodiment may merely be regarded as examples of the claimed subject matters. Below will be described modified examples of the present embodiment.

For example, in the embodiment described above, the controller 50 determines whether the read data contains the second and third timing adjuster patterns 62, 63 when the reader 32 completes reading the second readable area 31*c* and conducts the adjusting process only when the read data contains the second and third timing adjuster patterns 62, 63. However, the adjusting process may be conducted when the reader 32 completes reading the second readable area 31*c*, without determining the whether the read data contains the second and third timing adjuster patterns 62, 63. In this arrangement, the recordable sheet P placed on the placement table 31 in the predetermined orientation may have a test pattern different from the second or third timing adjuster pattern 62, 63 recorded thereon in the rightward area with respect to the first timing adjuster pattern 61.

For another example, the controller 50 may not necessarily determine whether the read data generated based on the outcome of reading so far by the reader 32 includes the data for both the first timing adjuster pattern 61 and the markers 65.

In other words, for example, the controller 50 may determine whether the read data includes the data for the first timing adjuster pattern 61 but may not determine whether the read data includes the data for the markers 65. In this arrangement, the test patterns may not include the markers 65. For another example, the controller 50 may determine whether the read data includes the data for the markers 65 but may not determine whether the read data includes the data for the first timing adjuster pattern 61.

For another example, the controller 50 may determine whether the read data includes a test pattern, which extends longitudinally in the conveying direction on the recordable sheet P placed on the placement table 31 in the predetermined orientation but is different from the first timing adjuster pattern 61.

For another example, the test patterns to be read from the recordable sheet P may not necessarily be the first through third timing adjuster patterns 61-63 and the evenness adjuster patterns 64a-64d. For example, the first through third timing adjuster patterns 61-63 and the evenness adjuster patterns 64a-64d may be partly recorded, and the recorded parts of the first through third timing adjuster patterns 61-63 and the evenness adjuster patterns 64a-64d may be read as the test patterns. For another example, test patterns different from the first through third timing adjuster patterns 61-63 and from the evenness adjuster patterns 64a-64d may be recorded to be used as the test patterns.

For another example, the controller 50 may not necessarily determine whether the read data generated based on the outcome of reading so far includes the data for the specific test pattern, e.g., the first timing adjuster pattern 61 and the markers 65, while the reader 32 is pausing, but the controller 50 may determine whether the read data generated based on the outcome of reading so far satisfies a predetermined condition other than the presence of the data for the specific test pattern or the markers.

For another example, the evenness adjuster patterns 64a-64c may not necessarily be read in the order described above such that the reader 32 reads the evenness adjuster patterns 64a, 64b recorded in the inks of black and cyan, respectively, while the light source 42a emits the red light, and after the red-light emitted states, in which the light source 42a emits the red light, shifts to the blue-light emitted state, in which the light source 42c emits the blue light, the reader 32 reads the evenness adjuster patterns 64c, 64d recorded in the inks of yellow and magenta, respectively. For example, the reader 32 may read the evenness adjuster patterns 64a-64d while the light sources 42a-42c emit the red light, the green light, and the blue light simultaneously. However, in this arrangement, compared to the configuration of the embodiment described above, accuracy concerning the evenness in each part in the evenness adjuster patterns 64a-64d obtained from the outcomes of reading the evenness adjuster patterns 64a-64d may be lower.

For another example, a test pattern, which is recorded in ink in one of black and cyan but is different from the evenness adjuster patterns 64a, 64b may be recorded, and the reader 32 may read the different test pattern while the light source 42a emits the red light. Moreover, a test pattern, which is recorded in ink in one of yellow and magenta but is different from the evenness adjuster patterns 64c, 64d may be recorded, and the reader 32 may read the different test pattern while the light source 42a emits the blue light.

For another example, the reader 32 may not necessarily be controlled to stop reading only when the image being read does not contain the test patterns but may be controlled to stop reading when the image being read does not contain the test pattern and when the image being read contains the test patterns. In this arrangement, the carriage motor 58 may be controlled in the same manner when the reader 32 reads the image not containing the test patterns as when the reader 32 reads the image containing the test patterns.

For another example, the recordable sheet P may not necessarily be shaped into the corrugated form waving up and down along the scanning direction by the pressers 14a in the corrugating plate 14, the ribs 20, and the corrugating spur wheels 17. For example, on an upper surface of the platen 15, vacuuming inlets to pull the recordable sheet P toward the platen 15 may be arranged at positions between adjoining ribs 20 along the scanning direction in place of the corrugating plates 14 and the corrugating spur wheels 17. In this arrangement, the recordable sheet P may be deformed into the corrugated form waving up and down along the scanning direction by being vacuumed at the vacuuming inlets.

For another example, the image recorder 2 may not necessarily have the mechanism to deform the recordable sheet P in the corrugated form along the scanning direction, but the image recorder 2 may discharge the ink at a recordable sheet P spreading flat horizontally. In this arrangement, the first through third timing adjuster patterns 61-63 may not be included in the test patterns.

For another example, the image recorder 2 and the image reader 5 may not necessarily be combined into the multifunction peripheral machine 1. In the following paragraphs, a modified example of the embodiment according to the present disclosure will be described.

In the modified example, as shown in FIG. 15, a system 100 includes a printer 101, a scanner 102, and a PC 103. The printer 101 may be in a configuration similar to the image recorder 2 in the embodiment described above. The scanner 102 may be in a configuration similar to the image reader 2 in the embodiment described above. In the following paragraphs, items in the printer 101 and the scanner 102 similar to those in the image recorder 2 and the image reader 5 in the embodiment described above may be referred to by the same reference sings.

The PC 103 is connected with the printer 101 and the scanner 102. The PC 103 includes a display 104, an operation interface 105, and a storage 106. The storage 106 may include a ROM, a RAM, and a flash memory. The storage 106 may store programs, which may cause the PC 103 to process operations, and data concerning the first through third timing adjuster patterns 61-63 and the markers 65 described above.

When a user commands the printer 101 to adjust the settings concerning the discharging timings and the amounts to discharge the ink from the nozzles 10 through the operation interface 105 of the PC 103, flows of processes shown in FIGS. 16A-16B may start, and the printer 101, the scanner 102, and the PC 103 may operate according to the flows.

In particular, in S301, the PC 122 may transmit a record-command signal to command the printer 101 to record the test patterns to the printer 101.

The printer 101 receiving the record-command signal from the PC 103 may record the test patterns on the recordable sheet P in S302 in the manner as described in the embodiment above. In S303, the printer 101 may transmit a record-completion signal indicating that recording of the test patterns is completed to the PC 103.

Meanwhile, the PC 103 may, after transmitting the record-command signal to the printer 101 in S301, await until the record-completion signal from the printer 101 is received. When the record-completion signal is received, in S304, the PC 103 may control the display 104 to display the message similar to the message displayed in S102 (see FIG. 11A). In S305, the PC 103 may await until a set-completion signal, entered by the user through the operation interface 105 and indicating that the user has set the recordable sheet P on the placement table 31 in the scanner 102, is received (S305: NO).

When the set-completion signal is received (S305: YES), in S306, the PC 103 may transmit a read-start command signal commanding the scanner 102 to start reading the recordable sheet P to the scanner 102.

The scanner 102 receiving the read command signal to read the test patterns from the PC 103 may conduct processes in S307-S310, which are similar to S104-S108 (see FIGS. 11A-11B). In S310, the scanner 102 may stop reading the test patterns, and in S311, transmit the read data generated based on the outcome of reading so far to the PC 103.

The PC 103 may, after transmitting the read-start command signal in S306, await until the read data from the scanner 102 is received. When the read data is received, in S312 and S313, the PC 103 may determine whether the received read data includes the data for the first timing adjuster pattern 61 and the markers 65, similarly to S108 and S111 (see FIG. 11B) in the embodiment described above.

In S312, when the PC 103 determines that the read data does not include the data for the first timing adjuster pattern (S312: NO) or in S313 that the read data does not include the data for the markers 65 (S313: NO), in S314, the PC 103 may transmit a read-abort command signal commanding the scanner 102 to abort reading the image to the scanner 104, and in S315, transmit an adjustment-abort command signal commanding the printer 101 to abort adjusting of the settings to the printer 101. In S315, the PC 103 may output an error alerting signal to the display 104 and control the display 6 to display an error message. The flow may end thereat.

On the other hand, when the PC 103 determines that the read data includes the data for the first timing adjuster pattern (S312: YES) and the data for the markers 65 (S313: YES), in S317, the PC 103 may transmit a read-resume command signal commanding the scanner 102 to resume reading the test patterns to the scanner 102.

The scanner 102 may, after transmitting the read data to the PC 103 in S311, await until one of the read-abort command signal and the read-resume command signal is received. When the read-abort command signal is received (S318: NO), in S319, the scanner 102 may abort reading the test patterns, and the flow may end thereat.

When the read-resume signal is received (S318: YES), the scanner 102 may conduct processes in S320-S323, which are similar to S112-S115 (see FIG. 11B). In S324, the scanner 102 may control the light source 42*c* to stop emitting the blue light and thereafter transmit the read data to the PC 103. The process may end thereat.

The PC 103 may, after transmitting the read-resume command signal in S317, await until the read data from the scanner 102 is received. When the read data is received, in S325, the PC 103 may determine whether the received read data includes the data for the second and third timing adjuster patterns 62, 63, similarly to S116 (see FIG. 11B) in the embodiment described above.

In S325, when the PC 103 determines that the read data does not include the data for the second or third timing adjuster patterns 62, 63 (S325: NO), in S315, the PC 103 may transmit a read-abort command signal commanding the scanner 102 to abort reading the image to the scanner 104, and in S316, transmit the adjustment-abort command signal commanding the printer 101 to abort adjusting of the settings to the printer 101. In S316, the PC 103 may output an error alerting signal to the display 104 and control the display 6 to display an error message. The process may end thereat.

On the other hand, when the PC 103 determines that the read data includes the data for the second and third timing adjuster patterns 62, 63 (S325: YES), in S326, the PC 103 may generate adjustment data for adjusting the settings concerning the discharging timings and the amounts to discharge the ink from the nozzles 10. In S327, the PC 103 may transmit the generated adjustment data to the printer 101, and the process may end thereat.

The printer 101 may, after transmitting the record-completion signal to the PC 103 in S303, await until one of the adjustment-abort command signal and the adjustment data is received. When the adjustment-abort signal is received (S328: NO), the printer 101 may end the process thereat. On the other hand, when the adjustment data is received (S328: YES), in S329, based on the received adjustment data, the printer 101 may adjust the discharging timings to discharge the ink from the nozzles 10 in the recording passes and the amounts of the ink to be discharged from the nozzles 10. The process may end thereat.

According to the modified example described above, similarly to the embodiment described earlier, the error may be found while the test patterns are being read. Therefore, wasteful reading of the test patterns after finding the error may be avoided.

For another example, the present disclosure may not necessarily be applied to the inkjet printer being a serial printer, which may discharge the inks from the inkjet head while the inkjet head on the carriage moves in the scanning direction, but may be applied to a line printer having a linear inkjet head, which extends linearly over an entire widthwise range in a widthwise direction intersecting with the conveying direction.

For another example, the present disclosure may not necessarily be applied to a printer that may record the test patterns on the recordable sheet P in the ink discharged from the inkjet head through the nozzles. In other words, the present disclosure may be applied to a printer that may record an image on a recordable medium other than the recordable sheet, such as, for example, fabric such as T-shirts, sheets for outdoor billboards, cases or shells for mobile terminals such as smartphones, cardboards, resin members, and so on. For another example, the liquid to be discharged from the discharging head through the nozzles may not necessarily be limited to the inks. In other words, the present disclosure may be applied to an image recording apparatus, a multifunction peripheral machine, an image recording system, an image recording method to record a test pattern by the image recording apparatus, and a computer-readable medium to store computer-readable instructions to control a computer in the image recording apparatus, while the liquid to be discharged may be any other liquid than ink.

What is claimed is:

1. An image reading apparatus, comprising:
 a placement table, on which a recordable medium with an image recorded thereon is placeable;

a reader configured to read the image recorded on the recordable medium placed on the placement table, the reader being configured to move in one direction while reading the image;

a memory configured to store information concerning a test pattern; and a controller configured to control the reader to read the image recorded on the recordable medium placed on the placement table, the controller being configured to, when instructed to read the test pattern being the image recorded on the recordable sheet, control the reader to stop reading to pause before reading the test pattern completely, while the reader pauses, based on read data generated from an outcome of reading of the test pattern so far and the information concerning the test pattern stored in the memory, determine whether the read data satisfies a predetermined condition, and when the read data satisfies the predetermined condition, control the reader to resume reading the test pattern, but when the read data does not satisfy the predetermined condition, control the reader to abort reading the test pattern and output an error alerting signal indicating that the read data contains an error.

2. The image reading apparatus according to claim 1, wherein the information concerning the test pattern includes information concerning a first test pattern, the first test pattern being configured to be arranged to extend in a direction orthogonal to the one direction on the recordable medium, when the recordable medium with the test pattern recorded thereon is placed on the placement table in a predetermined orientation, at one of a stopping position, at which the reader is controlled to pause before reading the test pattern completely, and a position upstream from the stopping position in the one direction, and wherein the controller is configured to, when instructed to read the test pattern including a plurality of test patterns including the first test pattern and a second test pattern, the second test pattern being configured to be arranged at a position downstream from the stopping position in the one direction when the recordable medium with the test pattern recorded thereon is placed on the placement table in the predetermined orientation:

control the reader to stop reading to pause at the stopping position before reading the plurality of test patterns completely, and while the reader pauses, determine whether the read data satisfies the predetermined condition including a condition whether the read data includes data for the first test pattern.

3. The image reading apparatus according to claim 1, wherein the reader comprises:

a first light emitter configured to emit light in a first color; and a second light emitter configured to emit light in a second color different from the first color, and wherein the controller is configured to, when instructed to read the test pattern including a plurality of test patterns including:

a first color pattern configured to be arranged on the recordable medium at one of a stopping position, at which the reader is controlled to pause before reading the test pattern completely, and a position upstream from the stopping position in the one direction, when the recordable medium with the test pattern recorded thereon is placed on the placement table in a predetermined orientation, the first color pattern having a color, of which color difference from the first color is equal to or greater than a predetermined value, and of which color difference from the second color is smaller than the predetermined value; and a second color pattern configured to be arranged on the recordable medium at a position downstream from the stopping position in the one direction, when the recordable medium with the test pattern recorded thereon is placed on the placement table in the predetermined orientation, the second color pattern having a color, of which color difference from the first color is smaller than the predetermined value, and of which color difference from the second color is equal to or greater than the predetermined value, control the reader to read the test pattern by moving in the one direction and emitting the light in the first color from the first light emitter at the recordable medium placed on the placement table, control the reader to stop reading to pause at the stopping position before reading the test pattern completely, while the reader pauses, determine whether the read data satisfies the predetermined condition, when the read data satisfies the predetermined condition, control the reader to shift from a state, in which the first light emitter emits the light in the first color, to another state, in which the second light emitter emits the light in the second color, and control the reader to resume reading the test pattern by moving in the one direction and emitting the light in the second color from the second light emitter at the recordable medium placed on the placement table.

4. The image reading apparatus according to claim 1, wherein the controller is configured to, when instructed to read the image not including the test pattern recorded on the recordable medium, control the reader to continuously read the image completely without pausing.

5. The image reading apparatus according to claim 1, wherein the information concerning the test pattern includes information concerning a marker, the marker being configured to be arranged at one of a stopping position, at which the reader is controlled to pause before reading the test pattern completely, and a position upstream from the stopping position in the one direction on the recordable medium, when the recordable medium with the test pattern recorded thereon is placed on the placement table in a predetermined orientation, and wherein the controller is configured to, when instructed to read the test pattern including the marker:

control the reader to stop reading to pause before reading the test pattern completely, and while the reader pauses, determine whether the read data satisfies the predetermined condition including a condition whether the read data includes data for the marker.

6. A multifunction peripheral machine, comprising:

a recorder configured to record an image on a recordable medium;

a placement table, on which a recordable medium with an image recorded thereon is placeable;

a reader configured to read the image recorded on the recordable medium placed on the placement table, the reader being configured to move in one direction while reading the image;

a memory configured to store information concerning a test pattern; and a controller configured to:
control the recorder to record the test pattern being the image on the recordable medium,
when instructed to read the test pattern, control the reader to start reading the test pattern recorded on the recordable medium placed on the placement table,
control the reader to stop reading to pause before reading the test pattern completely,
while the reader pauses, based on read data generated from an outcome of reading of the test pattern so far and the information concerning the test pattern stored in the memory, determine whether the read data satisfies a predetermined condition, and
when the read data satisfies the predetermined condition, control the reader to resume reading the test pattern, but when the read data does not satisfy the predetermined condition, control the reader to abort reading the test pattern and output an error alerting signal indicating that the read data contains an error.

7. The multifunction peripheral machine according to claim 6,
wherein the information concerning the test pattern includes information concerning a first test pattern, the first test pattern being configured to be arranged to extend in a direction orthogonal to the one direction on the recordable medium, when the recordable medium with the test pattern recorded thereon is placed on the placement table in a predetermined orientation, at one of a stopping position, at which the reader is controlled to pause before reading the test pattern completely, and a position upstream from the stopping position in the one direction,
wherein the controller is configured to record the test pattern including a plurality of test patterns including the first test pattern and a second test pattern, the second test pattern being configured to be arranged at a position downstream from the stopping position in the one direction when the recordable medium with the test pattern recorded thereon is placed on the placement table in the predetermined orientation,
wherein the controller is configured to, when instructed to read the test pattern including the plurality of test patterns recorded on the recordable medium placed on the placement table:
control the reader to stop reading to pause at the stopping position before reading the plurality of test patterns completely, and
while the reader pauses, determine whether the read data satisfies the predetermined condition including a condition whether the read data includes data for the first test pattern.

8. The multifunction peripheral machine according to claim 7,
wherein the recorder comprises:
a recording head comprising nozzles;
a carriage, on which the recording head is mounted, the carriage being configured to move along a scanning direction;
a conveyer configured to convey the recordable medium in a conveying direction orthogonal to the scanning direction; and
a corrugating member configured to deform the recordable medium into a corrugated form along the scanning direction,
wherein the predetermined orientation is an orientation, in which a direction in the recordable medium parallel to the conveying direction when the test pattern is being recorded on the recordable medium aligns in parallel with the one direction, and
wherein the controller is configured to control the recorder to record a timing adjuster pattern as the first test pattern, the timing adjuster pattern reflecting a discharging timing to discharge liquid from the nozzles in a recording pass in one way, in which the controller controls the recording head to discharge the liquid from the nozzles while controlling the carriage to move in one way along the scanning direction, and a discharging timing to discharge the liquid from the nozzles in a recording pass in the other way, in which the controller controls the recording head to discharge the liquid from the nozzles while controlling the carriage to move in the other way along the scanning direction, at each position in the scanning direction on the recordable medium by performing the recording pass in one of the one way and the other way and a conveying action, in which the controller controls the conveyer to convey the recordable medium in the conveying direction, repeatedly.

9. The multifunction peripheral machine according to claim 8,
wherein the information concerning the test pattern further includes information concerning the second test pattern,
wherein the controller is configured to:
control the recorder to perform the recording pass and the conveying action repeatedly to record the test pattern including the timing adjuster pattern as the first test pattern and the timing adjuster pattern as the second test pattern,
when the reader resumed reading completes reading the plurality of test patterns, determine whether the read data includes data for the second test pattern,
when the read data includes the data for the second test pattern, set the discharging timings to discharge the liquid from the nozzles in the recording pass in the one way and the recording pass in the other way based on the data for the first test pattern and the data for the second test pattern, but when the read data does not include the data for the second test pattern, output the error alerting signal.

10. A system, comprising:
an image recording apparatus configured to record an image on a recordable medium;
an image reading apparatus, comprising:
a placement table, on which a recordable medium with an image recorded thereon is placeable; and
a reader configured to read the image recorded on the recordable medium placed on the placement table, the reader being configured to move in one direction while reading the image;
a memory configured to store information concerning a test pattern; and
a controller configured to:
control the recorder to record the test pattern being the image on the recordable medium;
when instructed to read the test pattern, control the reader to start reading the test pattern recorded on the recordable medium placed on the placement table,
control the reader to stop reading to pause before reading the test pattern completely, while the reader pauses, based on read data generated from an outcome of reading of the test pattern so far and the information concerning the test pattern stored in the memory, determine whether the read data satisfies a predetermined condition, and when the read data satisfies the predetermined condition, control the reader to resume reading the test pattern, but when the read data does not satisfy the predetermined condition, control the reader to abort reading the test pattern and output an error alerting signal indicating that the read data contains an error.

11. An image reading method for an image reading apparatus to read an image, the image reading apparatus comprising a placement table, on which a recordable medium with an image recorded thereon is placeable, a reader configured to read the image recorded on the recordable medium placed on the placement table, the reader being configured to move in one direction while reading the image, and a memory configured to store information concerning a test pattern, the method comprising:

controlling, when the image reading apparatus is instructed to read the test pattern being the image recorded on the recordable medium placed on the placement table, the reader to stop reading to pause before reading the test pattern completely, determining, while the reader pauses, based on read data generated from an outcome of reading of the test pattern so far and the information concerning the test pattern stored in the memory, whether the read data satisfies a predetermined condition, and controlling, when the read data satisfies the predetermined condition, the reader to resume reading the test pattern, but when the read data does not satisfy the predetermined condition, controlling the reader to abort reading the test pattern and outputting an error alerting signal indicating that the read data contains an error.

12. A non-transitory computer readable storage medium storing computer readable instructions that are executable by a computer configured to control an image recording apparatus, the image recording apparatus comprising a placement table, on which a recordable medium with an image recorded thereon is placeable, a reader configured to read the image recorded on the recordable medium placed on the placement table, the reader being configured to move in one direction while reading the image, and a memory configured to store information concerning a test pattern, the computer readable instructions, when executed by the computer, and when the computer is instructed to read the test pattern being the image recorded on the recordable sheet placed on the placement table, causing the computer to:

control the reader to start reading the test pattern, control the reader to stop reading to pause before reading the test pattern completely, while the reader pauses, based on read data generated from an outcome of reading of the test pattern so far and the information concerning the test pattern stored in the memory, determine whether the read data satisfies a predetermined condition, and when the read data satisfies the predetermined condition, control the reader to resume reading the test pattern, but when the read data does not satisfy the predetermined condition, control the reader to abort reading the test pattern and output an error alerting signal indicating that the read data contains an error.

\* \* \* \* \*